(12) United States Patent
Uchino et al.

(10) Patent No.: US 12,177,721 B2
(45) Date of Patent: Dec. 24, 2024

(54) PROTOCOL OVERHEAD REDUCTION FOR MEDIUM ACCESS CONTROL

(71) Applicant: QUALCOMM Incorporated, San Diego, CA (US)

(72) Inventors: Toru Uchino, Zushi (JP); Umesh Phuyal, San Diego, CA (US); Bharat Shrestha, San Diego, CA (US); Alberto Rico Alvarino, San Diego, CA (US); Xiao Feng Wang, San Diego, CA (US); Vivek Rajendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 17/654,401

(22) Filed: Mar. 10, 2022

(65) Prior Publication Data

US 2023/0319628 A1  Oct. 5, 2023

(51) Int. Cl.
*H04W 28/06* (2009.01)
(52) U.S. Cl.
CPC .................. *H04W 28/06* (2013.01)
(58) Field of Classification Search
CPC ..... H04L 1/0007; H04L 47/365; H04L 69/14; H04L 69/22; H04L 69/32; H04L 69/321; H04L 69/324; H04W 28/06
See application file for complete search history.

(56) References Cited

U.S. PATENT DOCUMENTS

| | | | |
|---|---|---|---|
| 10,057,033 B2* | 8/2018 | Agiwal | H04W 28/06 |
| 2009/0163211 A1* | 6/2009 | Kitazoe | H04W 74/004 |
| | | | 455/436 |
| 2017/0288821 A1* | 10/2017 | Baek | H04L 1/1635 |
| 2018/0103395 A1 | 4/2018 | Gholmieh et al. | |
| 2019/0230736 A1* | 7/2019 | Quan | H04W 28/06 |
| 2019/0335506 A1 | 10/2019 | Agiwal et al. | |
| 2021/0014730 A1* | 1/2021 | Zheng | H04L 1/1819 |
| 2022/0150973 A1* | 5/2022 | Lim | H04W 72/1268 |

FOREIGN PATENT DOCUMENTS

| | | |
|---|---|---|
| EP | 3585120 A1 | 12/2019 |
| WO | 2020138777 A1 | 7/2020 |

OTHER PUBLICATIONS

International Search Report and Written Opinion—PCT/US2023/011143—ISA/EPO—Jun. 26, 2023.
Partial International Search Report—PCT/US2023/011143—ISA/EPO—Apr. 28, 2023.

* cited by examiner

*Primary Examiner* — Thomas R Cairns
(74) *Attorney, Agent, or Firm* — Procopio, Cory, Hargreaves & Savitch

(57) ABSTRACT

A method, apparatus and computer-readable medium for transmitting a medium access control (MAC) protocol data unit (PDU) including one or more MAC service data units (SDUs) of a logical channel; and transmitting a first type of MAC subheader including or excluding first logical channel identifier (LCID) information and including or excluding first length information, wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

29 Claims, 24 Drawing Sheets

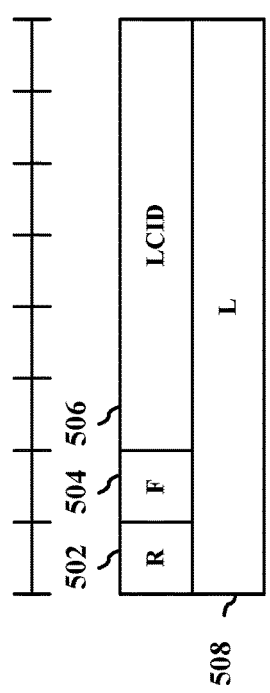
FIG. 5A
FIG. 5B
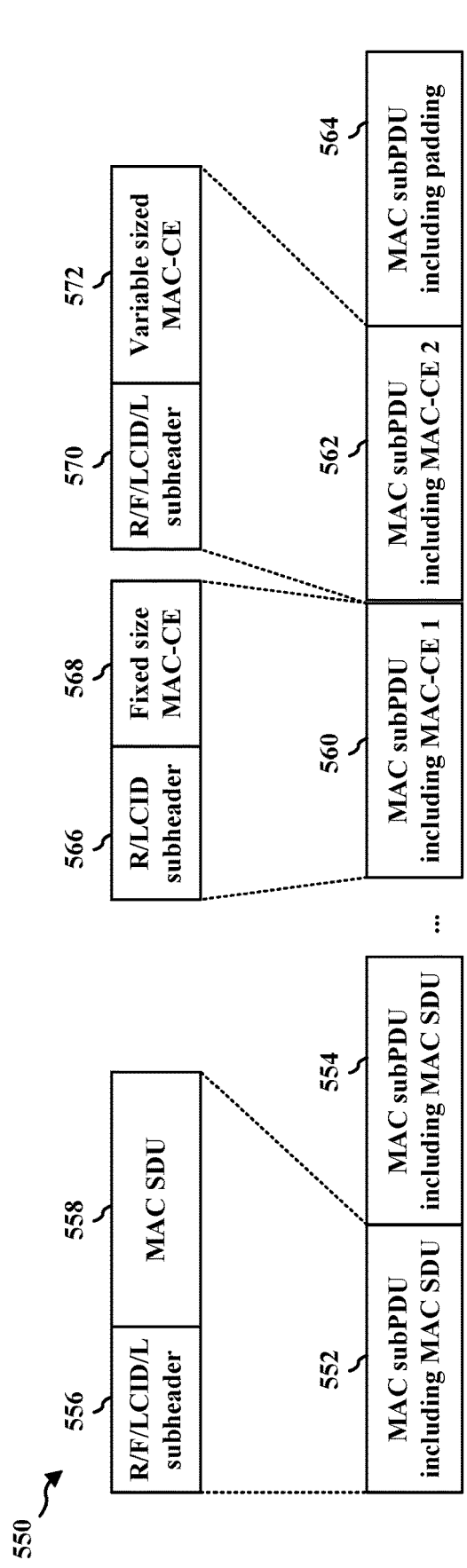
FIG. 5C

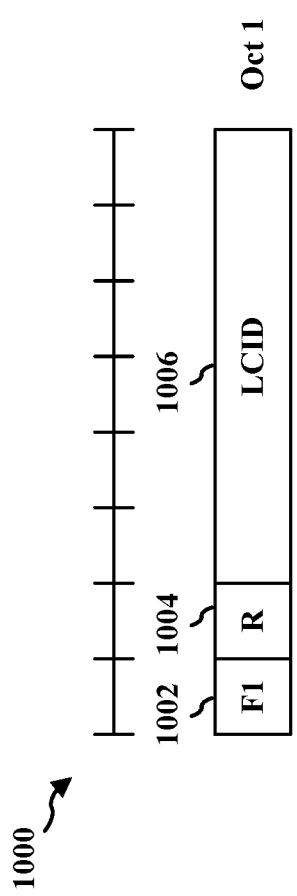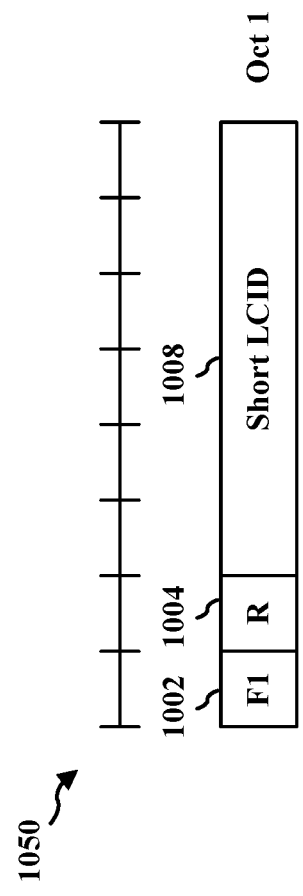
FIG. 10A
FIG. 10B

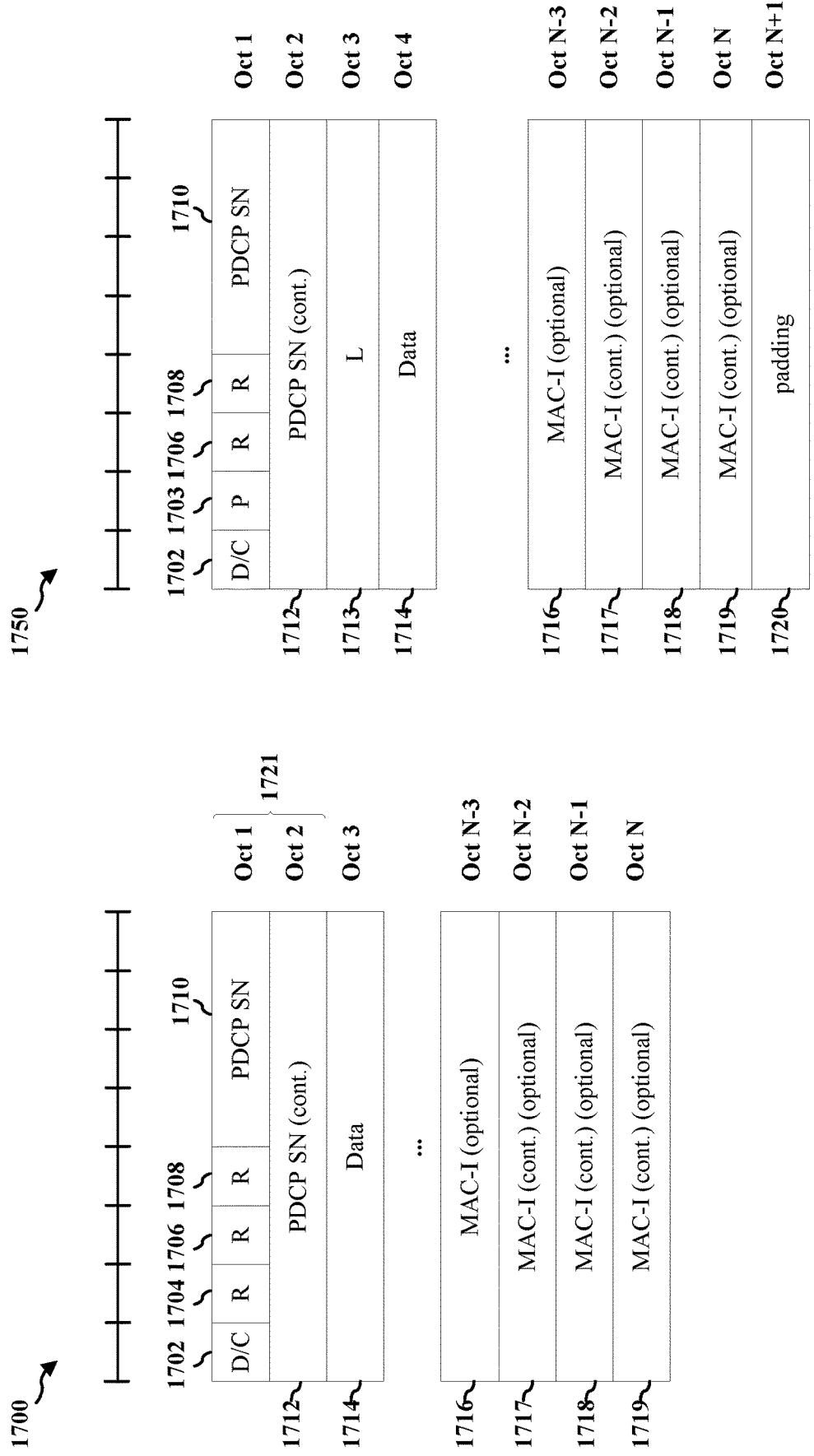

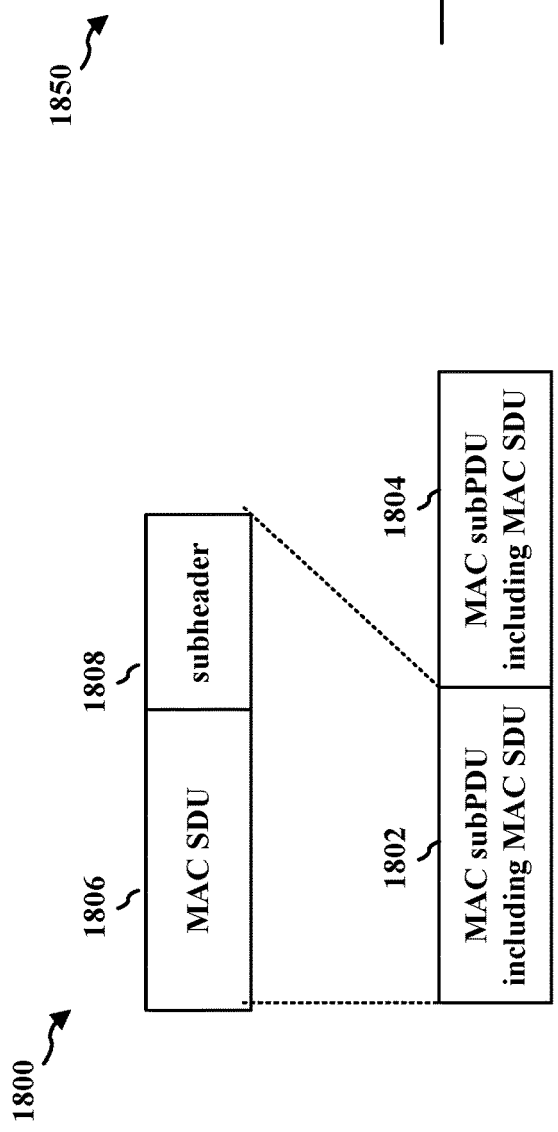
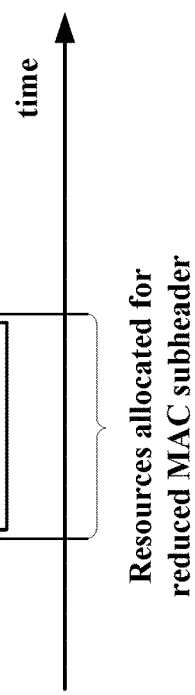
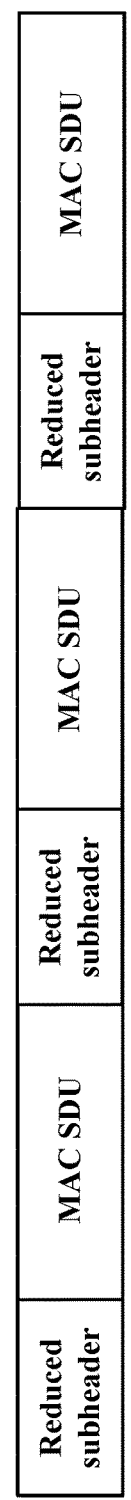
FIG. 18A
FIG. 18B
FIG. 18C

PROTOCOL OVERHEAD REDUCTION FOR MEDIUM ACCESS CONTROL

TECHNICAL FIELD

The present disclosure relates generally to communication systems, and more particularly, to wireless communication including a medium access control (MAC) protocol.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a medium access control (MAC) protocol data unit (PDU) including one or more MAC service data units (SDUs) of a logical channel; and transmits a first type of MAC subheader including or excluding first logical channel identifier (LCID) information and including or excluding first length information, wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

In an aspect of the disclosure, a method, a computer-readable medium, and an apparatus are provided. The apparatus obtains one or more MAC SDUs of a logical channel for a MAC PDU; and, in response to a first size of at least one of the MAC SDUs being different than a second size associated with a MAC subheader, performs at least one of: transmit a scheduling request for a MAC SDU having a different size than a size threshold; transmit the MAC PDU using a grant from multiple grants having a transport block size (TBS), the grant corresponding to the size of the one or more MAC SDUs in the MAC PDU; transmit the MAC PDU using a configured TBS from multiple configured TBSs, the configured TBS corresponding to the size of the one or more MAC SDUs in the MAC PDU; or pad a PDU to meet the size threshold.

In an aspect of the disclosure, a method, a computer-readable medium, and an apparatus are provided. The apparatus receives a MAC PDU including one or more MAC SDUs of a logical channel; and receives a first type of MAC subheader including or excluding first logical channel identifier information and including or excluding first length information, wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 5A and 5B illustrate example aspects of a MAC SDU subheader, in accordance with various aspects of the present disclosure.

FIG. 5C illustrates example aspects of a MAC PDU, in accordance with various aspects of the present disclosure.

FIGS. 10A and 10B illustrate example aspects of a MAC subheader without length information, in accordance with various aspects of the present disclosure.

FIGS. 17A and 17B illustrate aspects of a packet data convergence protocol (PDCP) protocol data unit (PDU) in accordance with various aspects presented herein.

FIGS. 18A, 18B, and 18C illustrate example aspects of a MAC PDU including overhead reduction as presented herein.

DETAILED DESCRIPTION

Figure 1:
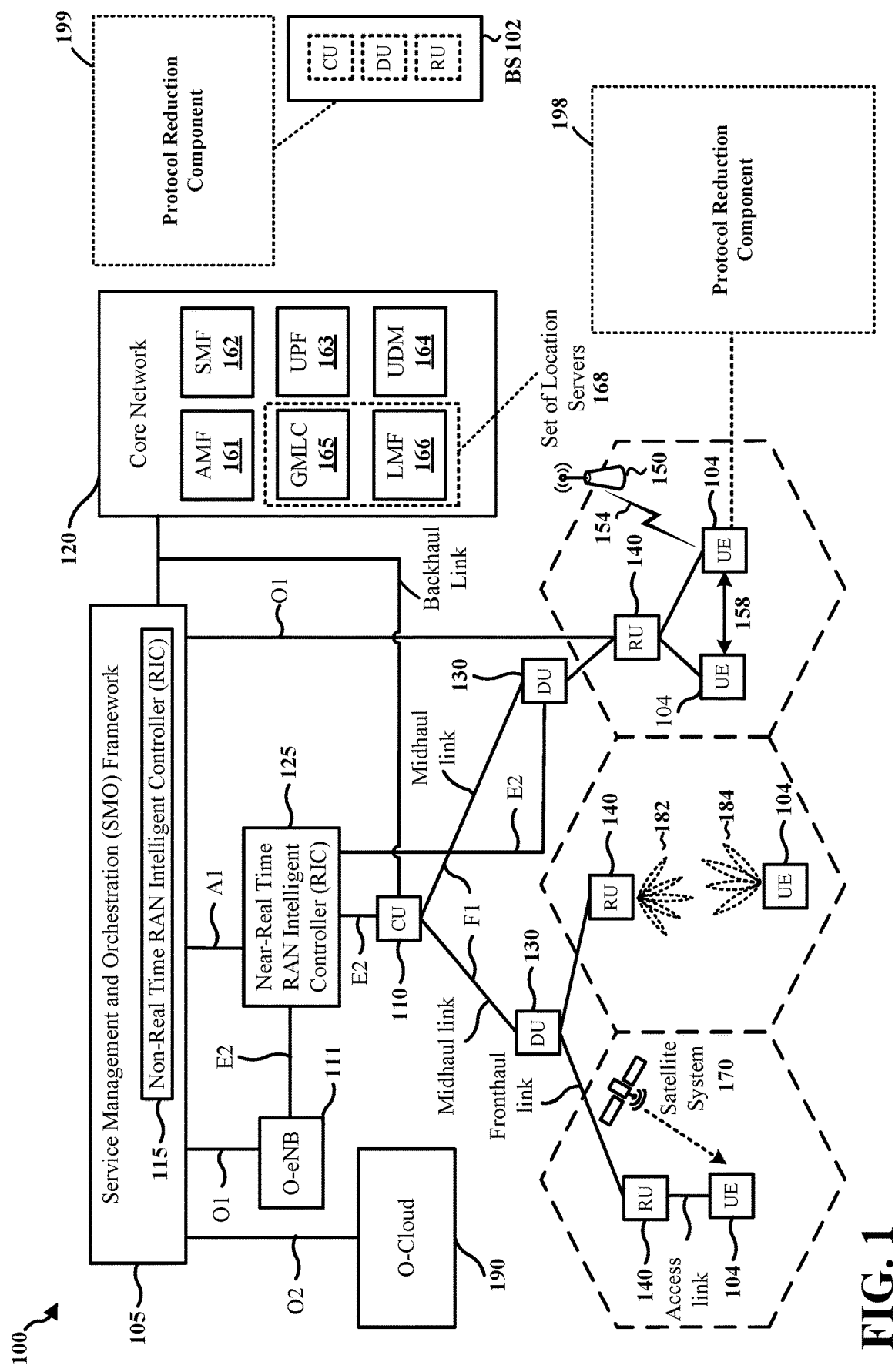
FIG. 1 is a diagram illustrating an example of a wireless communications system and an access network, in accordance with various aspects of the present disclosure.

Resources may be limited when transmitting or receiving data. As an example, when transmitting or receiving data using a non-terrestrial network (NTN) or a low data rate service using a terrestrial network (TN), it may be helpful to converse wireless resources. For example, when transmitting and receiving voice data over low-data rate services using commercial smartphones, large propagation delay and satellite movement may impact data resources. Reducing overhead when transmitting or receiving data may be advantageous when extending NR coverage enhancements to NTN. For each packet generated by a codec, protocol headers may incur significant overhead. For example, a wireless device may be configured to transmit or receive protocol headers for voice bearers every 20 milliseconds (ms).

Aspects presented herein provide for a reduction in protocol overhead by reducing a size of a MAC subheader overhead by compressing or removing LCID information and/or length (L) information from the MAC subheader. Aspects presented herein provide mechanisms to avoid misinterpretation by the receiver of MAC SDUs that are received with such overhead reduction.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a protocol reduction component 198 configured to transmit a MAC PDU including one or more MAC SDUs of a logical channel (LCH); and transmit a first type of MAC subheader including or excluding first LCID information and including or excluding first length information or a second type of MAC subheader including second LCID information and second length information, wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader. In some aspects, the protocol reduction component 198 may be configured to obtain one or more MAC SDUs of a logical channel for a MAC PDU; and, in response to a first size of at least one of the MAC SDUs being different than a second size associated with a MAC subheader, perform at least one of: transmit a scheduling request for a MAC SDU having a different size than a size threshold; receive multiple grants for different TBS and transmit the MAC PDU using one of the multiple grants having a TBS corresponding to the size of the one or more MAC SDUs in the MAC PDU; receive a single grant associated with multiple configured TBSs and transmit the MAC PDU using one of the multiple configured TBSs corresponding to the size of the one or more MAC SDUs in the MAC PDU; or pad a PDU to meet the size threshold. A network entity may include a protocol reduction component 199 configured to receive a MAC PDU including one or more MAC SDUs of a logical channel; and receive a first type of MAC subheader including or excluding first logical channel identifier information and including or excluding first length information or a second type of MAC subheader including second LCID information and second length information, wherein a size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

Although the following description may be focused on 5G NR, the concepts described herein may be applicable to other similar areas, such as LTE, LTE-A, CDMA, GSM, and other wireless technologies.

Figure 2:
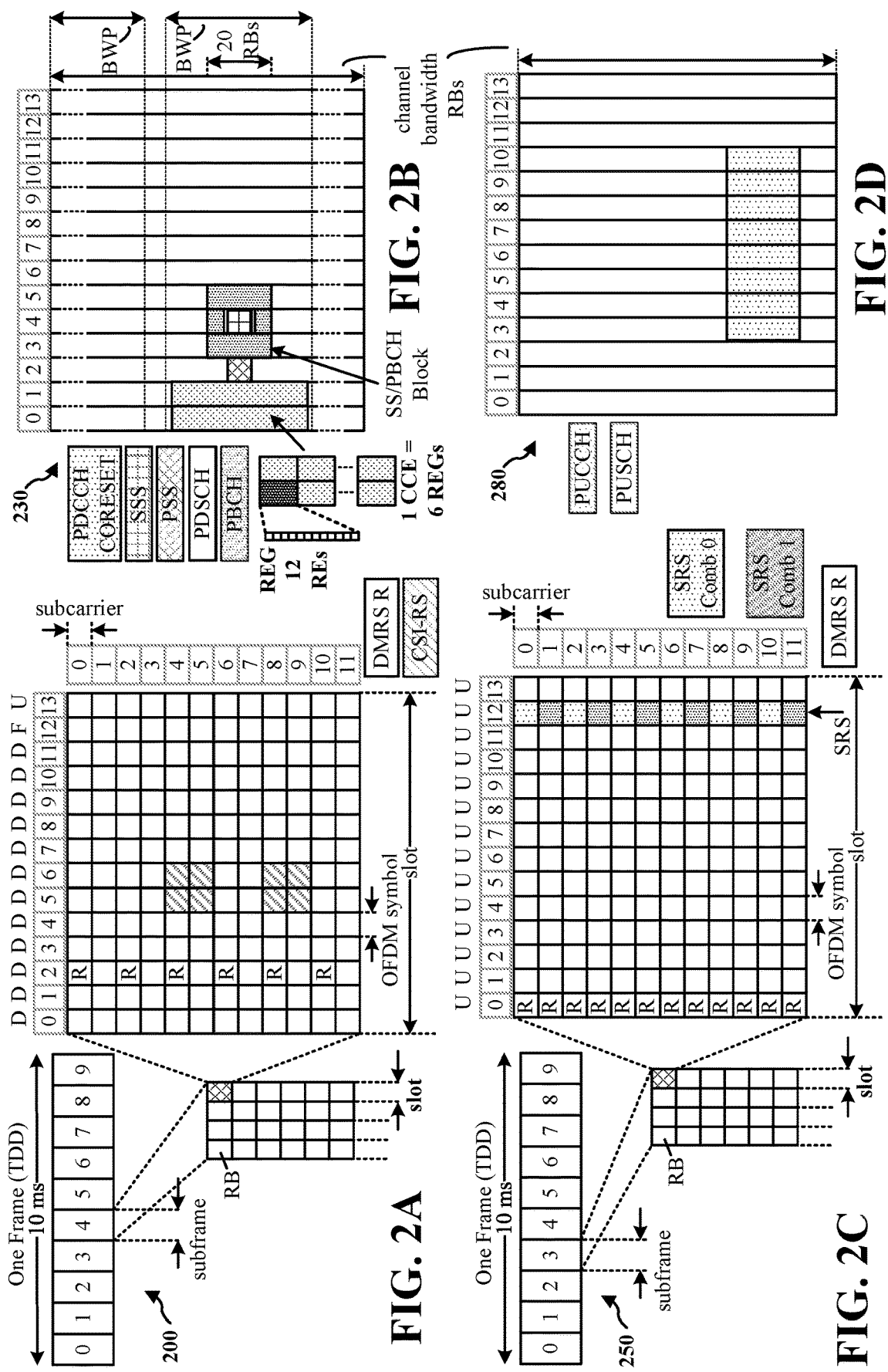
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu 0$ to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
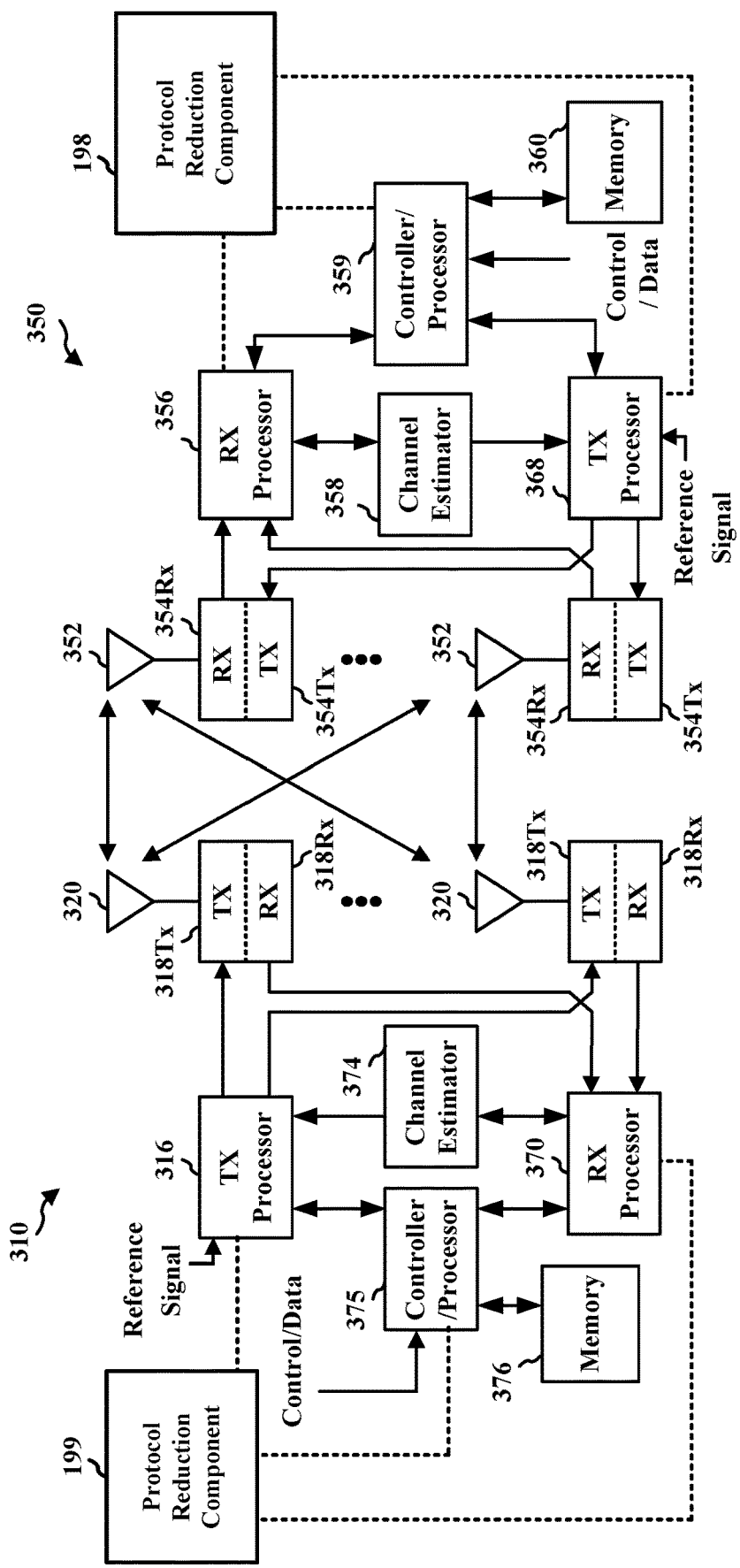
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the protocol reduction component 198 of FIG. 1.

At least one of the TX processor 316, the RX processor 370, and the controller/processor 375 may be configured to perform aspects in connection with the protocol reduction component 199 of FIG. 1.

Resources may be limited when transmitting or receiving data. As an example, when transmitting or receiving data using an NTN or a low data rate service using a TN, it may be helpful to converse wireless resources. For example, when transmitting and receiving voice data over low-data rate services using commercial smartphones, large propagation delay and satellite movement may impact data resources. Reducing overhead when transmitting or receiving data may be advantageous when extending NR coverage enhancements to NTN. For each packet generated by a codec, protocol headers may incur significant overhead. For example, a wireless device may be configured to transmit or receive protocol headers for voice bearers every 20 milliseconds (ms).

Figure 4:
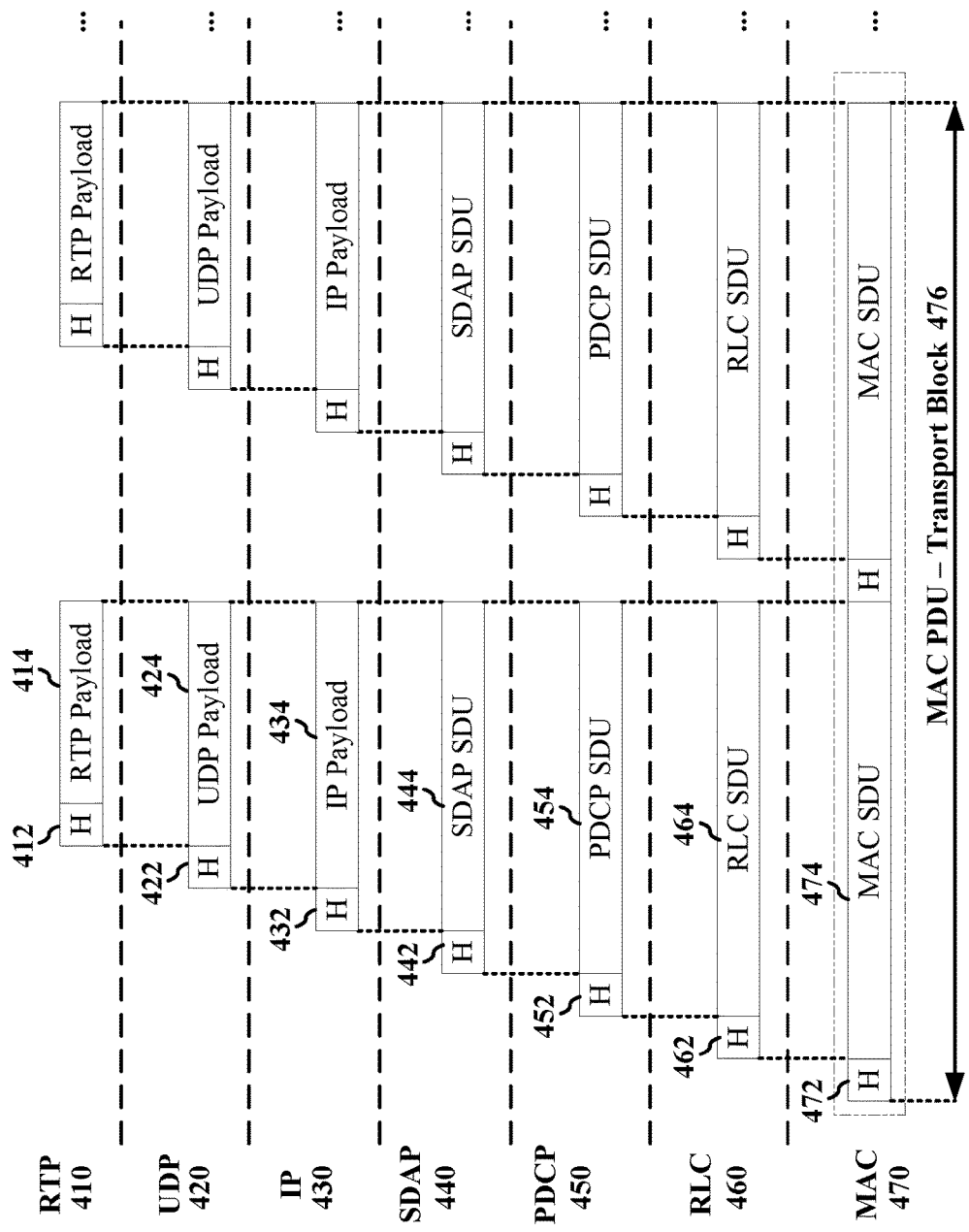
FIG. 4 is a diagram illustrating a series of example protocol headers that may be used to transport a payload, in accordance with various aspects of the present disclosure.

FIG. 4 shows a diagram 400 illustrating a series of example protocol headers that may be used to transport a payload. A MAC PDU transport block 476 may have a series of payloads with headers that span a real-time transport protocol (RTP) layer 410, a user datagram protocol (UDP) layer 420, an IP layer 430, an SDAP layer 440, a PDCP layer 450, an RLC layer 460, and/or a MAC layer 470. An RTP layer 410 of a data packet may include an RTP header 412 of 12 bytes and an RTP payload 414. A UDP PDU may include a UDP header 422 of 8 bytes and a UDP payload 424. An IP PDU may include an IP header 432 of at least 20 bytes and an IP payload 434. An SDAP PDU may include an SDAP header 442 of 1 byte and an SDAP SDU 444. A PDCP PDU may include a PDCP header 452 of 2 bytes and a PDCP SDU 454. The PDCP header 452 may include a 12-bit sequence number (SN). An RLC PDU may include an RLC header 462 of 3 bytes and an RLC SDU 464. The RLC header 462 may include a 6-bit SN and a segmented SDU. A MAC PDU may include a MAC header 472 of at least 2 bytes and a MAC SDU 474. The MAC header 472 may include an 8-bit length (L) field. In total, a MAC PDU transport block may include at least 47 bytes of overhead for each MAC SDU.

FIG. 5A shows an example of a MAC SDU subheader 500 of two bytes having a reserved bit field 502, a format field

504, an LCID field 506, and an L field 508. The reserved bit field 502 may be reserved for a future purpose. The format field 504 may be used to indicate a length of the L field 508. For example, the format field 504 may be set to 0 to indicate a length of 8 bits for the L field 508 or may be set to 1 to indicate a length of 16 bits for the L field 508. The LCID field 506 may be used to identify a logical channel instance of a corresponding MAC SDU or a type of a corresponding MAC-CE or a padding. The L field 508 may be used to indicate a length of a corresponding MAC SDU or variable-sized MAC-CE in bytes.

FIG. 5B shows an example of another MAC SDU subheader 530 of three bytes having a reserved bit field 532, a format field 534, an LCID field 536, an L field 538, and an extended LCID (eLCID) field 540. Aspects of the MAC subheader 530 in FIG. 5B may be similar to aspects of the MAC subheader 500 in FIG. 5A. For example, the reserved bit field 532, the format field 534, the LCID field 536, and the L field 538 may be similar to the reserved bit field 502, the format field 504, the LCID field 506, and the L field 508, respectively. The extended LCID field 540 may be used to identify a logical channel instance of a corresponding MAC SDU or a type of a corresponding MAC-CE. The three-byte MAC subheader 530 may be used in aspects that may be configured to use more logical channel identifiers than what the LCID field 506 of subheader 500 may be able to identify on its own.

FIG. 5C shows a diagram 550 of an example of a UL MAC PDU having a MAC subPDU 552, a MAC subPDU 554, a MAC subPDU 560, a MAC subPDU 562, and a MAC subPDU 564. Each MAC subPDU may have a subheader and an SDU of different patterns, such as the R/F/LCID/L subheader 556 for MAC SDU 558 of MAC subPDU 552, the R/LCID subheader 566 for the fixed size MAC-CE 568 of MAC subPDU 560, or the R/F/LCID/L subheader 570 for the variable size MAC-CE 572. Any suitable subheader, such as the two-byte subheader 500 in FIG. 5A or the three-byte subheader 530 in FIG. 5B may be used as a subheader for the R/F/LCID/L subheader 556, R/LCID subheader 566, or R/F/LCID/L subheader 570. Use of such subheaders, however, may not be optimal in some aspects. For example, using the subheader 530 in FIG. 5B may not be optimal where a logical channel may be adequately identified using only the 6-bit LCID field 536. A byte of space may be saved by using the subheader 500 in FIG. 5A instead.

Using even the shorter two byte subheader 500 in FIG. 5A may not be optimal to use for certain MAC subPDUs, such as the MAC subPDU 560, as an L field is not necessary for use with a fixed sized MAC-CE, such as the fixed sized MAC-CE 568 of diagram 550 in FIG. 5C. A subheader having an L field may not be necessary or useful for a fixed size MAC-CE, and so a smaller subheader may be more useful for such an aspect. In another aspect, a payload for a MAC may not use all 8 bits of the L field 508 in FIG. 5A to convey an accurate length, or may not use all 6 bits of LCID field 506 to convey an identifier.

Figure 6A:
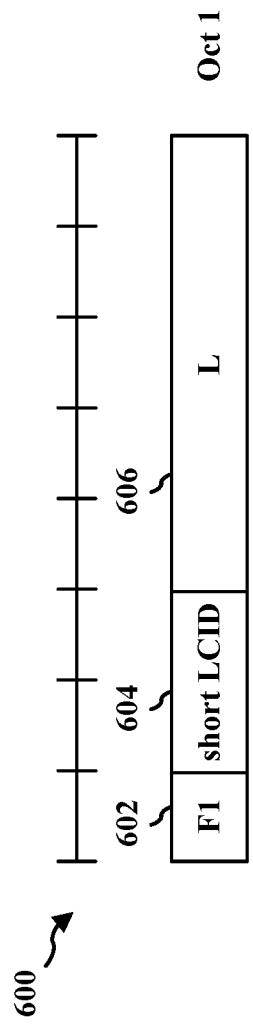
FIGS. 6A, 6B, and 6C illustrate example aspects of a MAC subheader having reduced information, in accordance with various aspects of the present disclosure.
Figure 6B:
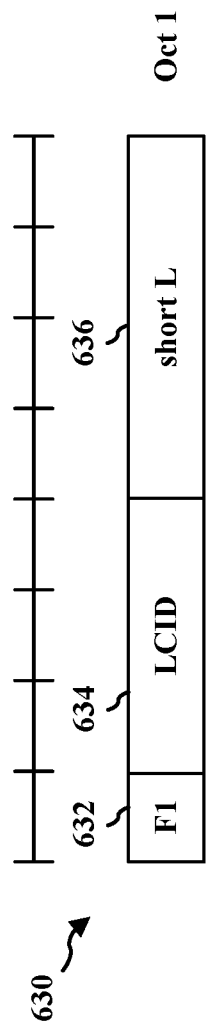
Figure 6C:
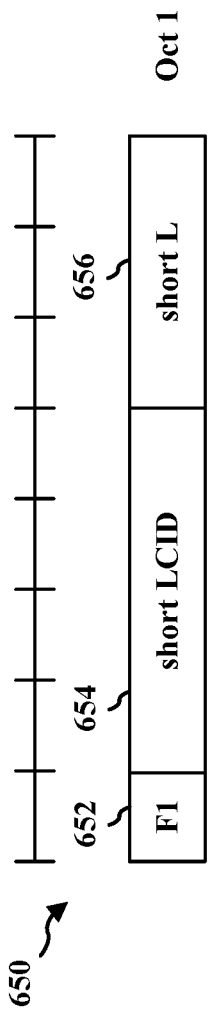

FIG. 6A-6C show examples of one-byte MAC SDU subheaders that may have a shorter LCID field or a shorter L field. FIG. 6A shows an example subheader 600 having a one-bit F1 field 602, a two-bit short LCID field 604 (which may also be referred to as compressed or reduced LCID information), and a five-bit L field 606. FIG. 6B shows an example subheader 630 having a one-bit F1 field 632, a three-bit LCID field 634, and a four-bit reduced L field 636 (which may also be referred to as compressed or reduced length information). FIG. 6C shows an example subheader 650 having a one-bit F1 field 652, a four-bit short LCID field 654, and a three-bit short L field 656. Using a one-byte subheader, such as the subheader 600 in FIG. 6A, the subheader 630 in FIG. 6B, or the subheader 650 in FIG. 6C may be more optimal than the two-byte subheader 500 in FIG. 5A or the three-byte subheader 530 in FIG. 5B, in some aspects. Any of the F1 fields 602, 632, or 652 may be used to indicate whether or not a one-byte subheader is being used (i.e., whether the MAC subheader is a reduced subheader or a non-reduced subheader). Any of the short LCID fields 604, 634, or 654 may be used to identify a logical channel instance of a corresponding MAC SDU or a type of a corresponding MAC-CE or a padding. In some aspects, the network may indicate that an eLCID field is not used for the corresponding LCHs. In some aspects, a network may provide a mapping table between an LCID/eLCID and a short LCID. Any of the short L fields 606, 636, or 656 may be used to indicate a length of a corresponding MAC SDU, a variable-sized MAC-CE or padding. In some aspects, the LCID/short LCID field and the L/short L field may be configured to be other sizes, for example the LCID/short LCID field may be one bit, two bits, three bits, four bits, five bits, or six bits, and the L/short L field may be six bits, five bits, four bits, three bits, two bits, or one bit, respectively. A value that is stored in a "short" labeled field, such as the short LCID field 654 and short L field 656 of subheader 650 may be configured to be a reduced version of a full value, such as the four least significant bits (LSBs) of a full LCID value and the three LSBs of a full L value.

By reducing an overhead of the MAC subheader down to one byte while keeping both information elements (IEs) in the MAC subheader, the MAC subheader may be able to be used to provide the same functionality that the subheader 500 in FIG. 5A and the subheader 530 in FIG. 5B provides, while saving space. By using the F1 field 602, 632, or 652 to designate whether this new format is used, a device may be able to use the subheaders 500 and 530 in the same system that the subheaders 600, 630, or 650 are used. For example, where the subheader 600 is being used, the F1 field 602 may indicate that a one-byte subheader having a 2-byte LCID field and a 5-byte L field, such as the subheader 600, or may indicate that a different subheader, such as the subheader 530 is being used. The reserved bit field 532 in subheader 530 may be used as an F1 field to designate use of the longer three-byte subheader 530 as opposed to the shorter one-byte subheader 600. A network entity, such as the BS 102 in FIG. 1, may be configured to configure a UE with mapping information between using the three-byte subheader 530 and the one-byte subheader 600 using the F1 field 602 to designate use of one subheader or the other.

In one aspect, a network entity may be configured to coordinate LCID/eLCID values for the LCHs to prevent the short LCID from overlapping across the LCHs. For example, the network entity may limit the max number of LCH and/or may define a short LCID as the LSBs of the LCID/eLCID value. For example, where a network entity is configured to use subheader 600 in FIG. 6A, the short LCID field 604 may be configured to store the two LSBs of the LCID/eLCID. The network entity may then select use of the subheader 600 in FIG. 6A when the LCID/eLCID is between 0 and 3, and use the subheader 530 in FIG. 5B when the LCID/eLCID is 4 or greater. In another aspect, where a network entity is configured to use subheader 630 in FIG. 6B, the short LCID field 634 may be configured to be the three LSBs of the LCID/eLCID. The network entity may then select use of the subheader 630 in FIG. 6B when the LCID/eLCID is between 0 and 7, and use the subheader 530 in FIG. 5B when the LCID/eLCID is 8 or greater. While the short LCID fields 604, 634, and 654 are labeled as "short," and the short L fields 606, 636, and 656 are labeled as "short," the data in the fields may not be truncated or shortened, and may be the full value stored in the shortened fields.

The length of the short LCID field 604 and the short L field 606 may be configurable, e.g., a network may configure the length for the UE. For example, a network entity may configure the length of the short LCID field and the length of the short L field to switch between the configuration of subheader 600, 630, and 650 using a RRC configuration or a MAC-CE message, allowing for a system to switch between using a first one-byte MAC subheader, such as the subheader 600 in FIG. 6A, and a second one-byte MAC subheader, such as the subheader 630 in FIG. 6B, in response to a conditional trigger, such as a request to describe additional logical channels, a request to describe L fields of different lengths, or a low rate of service. For example, an L field length of 7 bits (128 bytes) may be used for a voice rate of below 49.5 kbps, an L field length of 6 bits (64 bytes) may be used for a voice rate of below 23.9 kbps, an L field length of 5 bits (32 bytes) may be used for a voice rate of below 11.1 kbps and an L field length of 4 bits (16 bytes) may be used for a voice rate of below 4.7 kbps. In one aspect, where a system is configured to use the subheader 600 in FIG. 6A with a short L field 606 of 5 bits or the subheader 530 in FIG. 5B, the UE may be configured to use the subheader 600 for a MAC SDU length shorter than 32 bytes, and use the subheader 530 for a MAC SDU length longer than 32 bytes.

In one aspect the network entity may be configured to explicitly define the length of the short LCID field and/or the L field, for example by providing a length of the short LCID field and/or the L field in an IE of a signal, such as an RRC configuration, a MAC-CE message, or a PDCCH (DCI). In another aspect, the network entity may be configured to implicitly define the length of the short LCID field, for example by defining a number of LCHs configured with the short LCID. For example, where a network entity defines four LCHs to be configured to allow to use the short LCID field and the rest to be configured not to use the short LCID field (e.g., by using a different subheader with a different LCID/eLCID field, such as the subheader 530 in FIG. 5B), the network may implicitly define the short LCID field to be two bits long. Where a network entity defines eight LCHs to be configured to allow to use the short LCID and the rest to be configured not to use the short LCID, the network may implicitly define the short LCID to be three bits long. Similarly, the network may define the length of the L field implicitly by providing a length of the short LCID field either explicitly or implicitly, as the length of the L field may be implicitly defined as seven minus the length of the short LCID field (e.g., where the short LCID field length is 2 bits, then the L field length is 7−2=5 bits).

A plurality of logical channels (LCH) may be able to take advantage of a reduced header size, for example multiple RTP flows, voice and gaming, or carrier aggregation (CA) based packet duplication. A network entity and/or a UE may be configured to multiplex with multiple MAC SDUs (e.g., from the same or different LCHs), MAC-CE, and/or padding in a MAC PDU. In other words, a transmitter may be configured to multiplex multiple MAC SDUs in a single MAC PDU. In some aspects, the overhead reduced MAC subheader may be achieved through removal of the LCID field. Thus, in some aspects, a transmitter may transmit a MAC subheader than does not include LCID information. The removal of the LCID field may enable the overhead of the MAC subheader to be reduced to one byte.

Figure 7:
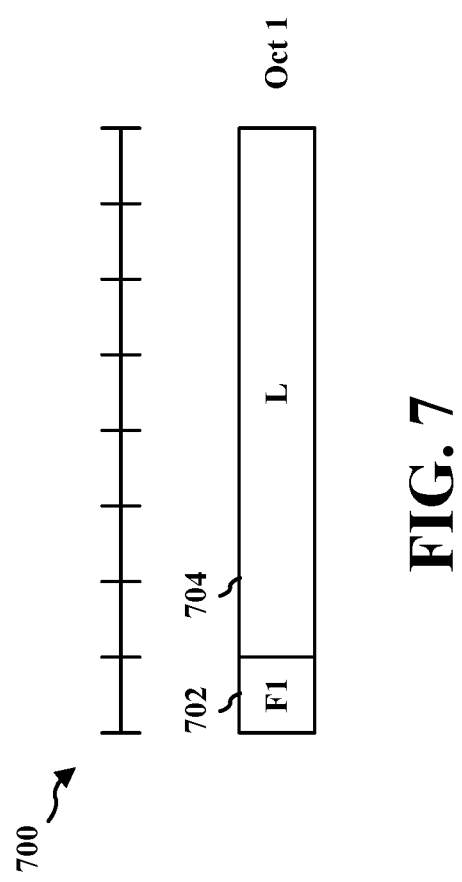
FIG. 7 illustrates example aspects of a MAC subheader without LCID information, in accordance with various aspects of the present disclosure.

FIG. 7 shows an example of a one-byte subheader 700 that may not have an LCID field having a one-bit F1 field 702 and a 7-bit L field 704. Similar to the subheader 600 in FIG. 6A, the F1 field 702 may be used to indicate whether or not a one-byte subheader is being used and the L field 704 may be used to indicate a length of a corresponding MAC SDU or a variable-sized MAC-CE. The length of the L field may be configurable by a network entity, for example based on as an RRC configuration, a MAC-CE message, or a PDCCH (DCI). A device may be configured to use the one-byte subheader 700 in response to a conditional trigger, such as a low rate of service. For example, a device may be configured to use an L field length of 7 bits (supporting up to 128 bytes of MAC SDU size) may be used for a voice rate of below 49.5 kbps. In some aspects, a UE may use this format, e.g., without the LCID field, for an LCH if the MAC SDU size (or RLC PDU/RLC SDU) corresponds to a configured size indicated by the network. For example, a UE may be configured to use the one-byte subheader 700 (e.g., by setting the F1 field 702 to 1) when the L field is sufficient for the MAC SDU size, and use the subheader 530 in FIG. 5B (which may have a 16 bit when the F field is set to 1), when the L field 704 is not sufficient for the MAC SDU size. If the MAC SDU is not the configured size, the UE may include a MAC subheader that includes a larger L field. For example, if the MAC SDU is larger than 128 bytes (for which the 7-bit L field 704 is insufficient), the UE may be configured to use the subheader 530 in FIG. 5B by setting the F1 field 702 to 0. The network may indicate the configured size for the MAC SDU to the UE in any of various signaling, e.g., such as a PDCCH (e.g., in DCI), a C-RNTI, a transport channel, a MAC-CE, or an RRC message (e.g., in an LCH configuration).

Since the subheader 700 does not have an LCID field, a device using the subheader 700 may be configured to not multiplex the MAC SDUs from different LCHs (however multiplexing with multiple MAC SDUs from the same LCH, MAC-CE, and padding in a MAC PDU is still possible). For example, a device using the subheader 700 may be configured to only multiplex the MAC SDUs for a voice channel or for a signaling radio bearer (SRB) channel.

Figure 8:
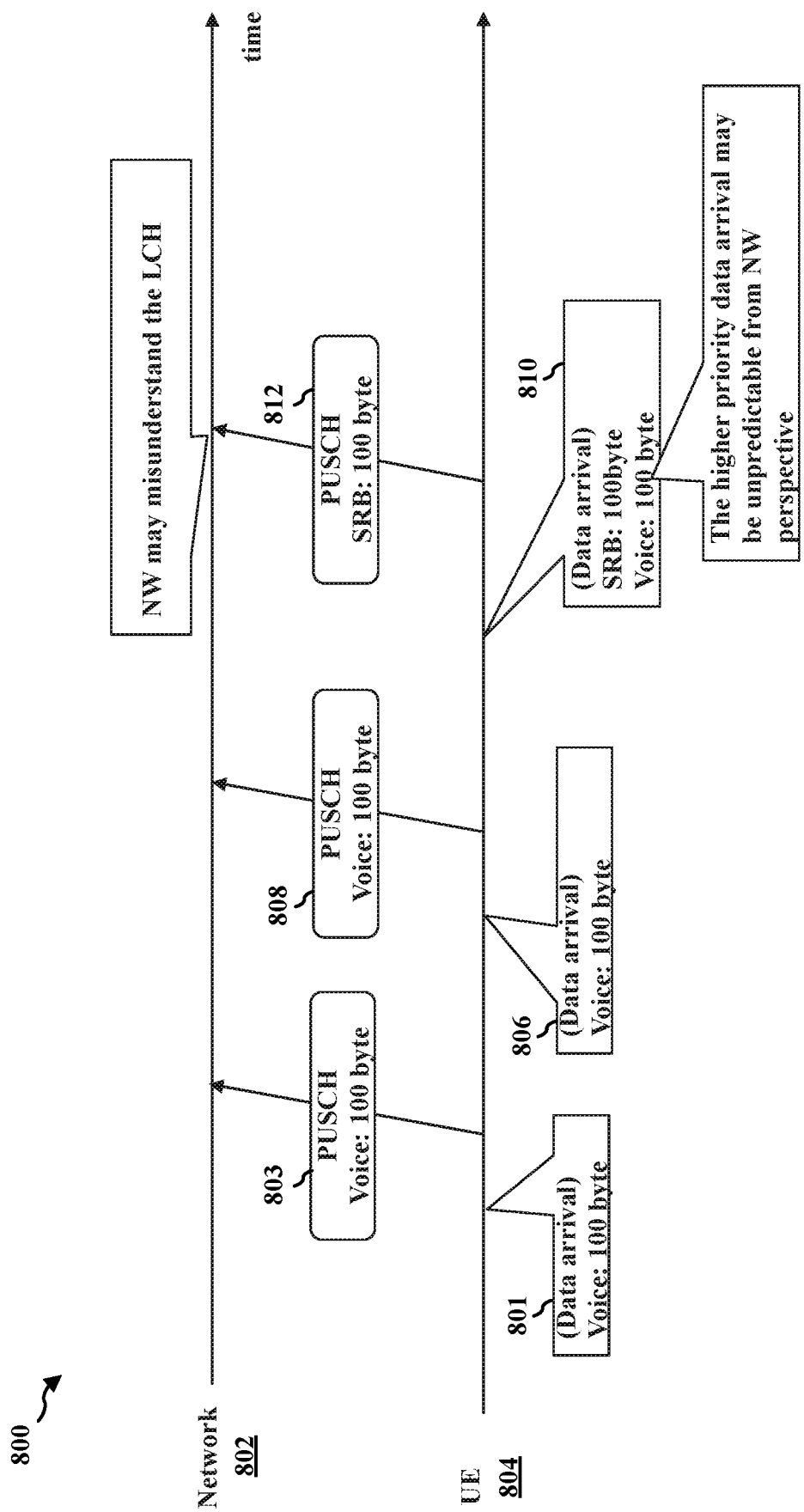
FIG. 8 is a communication flow diagram between a UE and a network entity, in accordance with various aspects of the present disclosure.

FIG. 8 shows an example communication flow diagram 800 between a network entity 802 and a UE 804 configured to use a subheader without an LCID field, such as the subheader 700 in FIG. 7. The UE 804 may be configured to use the subheader 700 in FIG. 7 for 100 bytes of a voice payload for PUSCH transmissions. A 7-bit L field 704 may be determined to be sufficient to describe 100 bytes of data, as 100 bytes is less than 128 bytes. At 801, a voice data payload of 100 bytes may arrive, and at 803 the UE 804 may output a PUSCH signal having 100 bytes of voice data using a subheader without an LCID field. At 806, another voice data payload of 100 bytes may arrive, and at 808 the UE may output, e.g., transmit, a PUSCH signal having 100 bytes of voice data using the subheader without an LCID field.

At 810, a voice data payload of 100 bytes may arrive, and an SRB of 100 bytes may arrive. The UE 804 may be configured to accommodate MAC SDUs as much as possible from the LCHs for which the data is available for transmission with an order of priority of the LCHs. Since SRB data may have a higher priority than voice data, at 812 the UE 804 may be configured to then transmit a PUSCH signal having 100 bytes of SRB data using the subheader without an LCID field. However, the network entity 802 may misunderstand the LCH, as the network entity may expect only voice data using the subheader without the LCID field. In other words, the network entity 802 may not be fully aware of the buffer status in the UE 804 (e.g., that the UE 804 is currently transmitting SRB data and will transmit voice data later), but the network entity 802 may require additional data to be able to identify the LCH of the MAC SDU(s) in a MAC PDU.

While the example communication flow diagrams, such as communication flow diagram 800 may indicate specific packet sizes such as 100 bytes, such packet sizes are indicated to be used as an example and may be other larger or smaller sizes. In addition, the indicated example grant packet sizes are indicated as example grant sizes for the MAC SDU and may not take the header size into account.

Figure 9A:
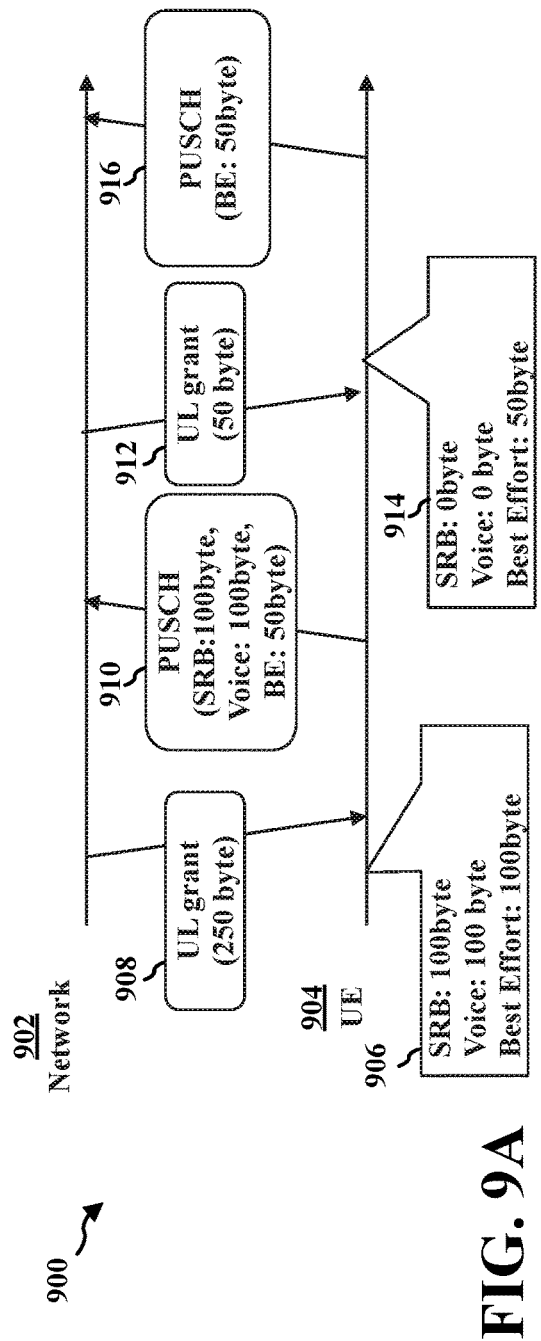
FIGS. 9A and 9B are communication flow diagrams between a UE and a network entity including overhead reduction as presented herein.

FIG. 9A shows an example communication flow diagram 900 between a network entity 902 and a UE 904 configured to use a subheader with an LCID field, such as the subheader 500 in FIG. 5A or the subheader 530 in FIG. 5B. At 906, the UE may be configured to transmit SRB data of 100 bytes, voice data of 100 bytes, and best effort data of 100 bytes. At 908 the network entity 902 may provide the UE with an UL grant of 250 bytes to the UE 904. At 910, the UE 904 may transmit a PUSCH to the network entity 902 having 100 bytes of SRB data, 100 bytes of voice data, and 50 bytes of best effort data using a subheader with an LCID field, such as the subheader 500 in FIG. 5B. The UE 904 may multiplex MAC SDUs from the SRB, voice, and best effort LCHs by using the LCID field to identify each LCH. At 912 the network entity 902 may provide the UE an UL grant of 50 bytes to the UE 904. At 914 the UE 904 may now have only 50 bytes of best effort data to output. At 916 the UE the UE 904 may transmit a PUSCH to the network entity 902 having 50 bytes of best effort data using the subheader with an LCID field. The subheader may, again, use the LCID field to identify that the data is best effort data, which the network entity may use to recognize the data.

Figure 9B:
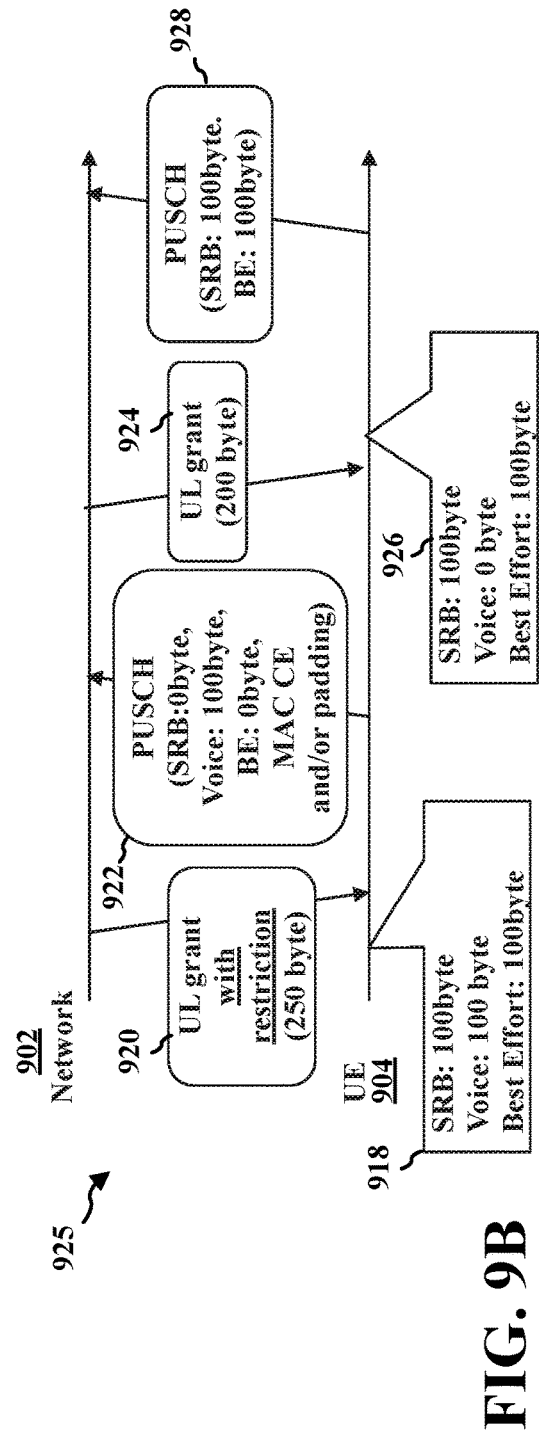

FIG. 9B shows an example communication flow diagram 925 between a network entity 902 and a UE 904 configured to use a subheader without an LCID field, such as the subheader 700 in FIG. 7. At 918, the UE may be configured to output SRB data of 100 bytes, voice data of 100 bytes, and best effort data of 100 bytes. At 920 the network entity 902 may output an UL grant of 250 bytes to the UE 904 with a restriction that the data be voice data. For example, the network entity 902 may transmit a DCI to the UE that selects the logical channel for voice data to be associated with the allocation of resources for the MAC PDU of 250 bytes. In other words, if requested by the network entity 902 in the UL grant at 920, the UE 904 may include the data from configured voice LCH and not data from other LCHs in the MAC SDU based on the UL grant. The network entity 902 may be configured to explicitly indicate the LCID in the DCI of the grant. In another aspect, the network entity 902 may indicate a quality of service (QoS) parameter associated with the LCH, such as a 5G QoS identifier (5QI), a QoS, a priority, packet delay budget (PDB), and the UE 904 may be configured to use the LCH associated with the QoS parameter. The system may be configured to ensure that multiple LCHs do not share the same QoS parameter (i.e., each QoS parameter is associated with one LCID max).

In one aspect, the network entity 902 may select or indicate an LCH statically or semi-statically. For example, the network entity 902 may output an RRC configuration to the UE 904 that indicates an LCH associated with time and/or frequency resources allocated to the UE 904 (e.g., configured grant (CG) resources). In another aspect, the network entity 902 may select or indicate an LCH dynamically. For example, the network entity 902 may output a PDCCH (DCI), cell radio network temporary identifier (C-RNTI), or transport channel that indicates to the UE an LCH that the UE 904 associated with an UL grant. The UE may transmit a MAC SDU with data for the LCH, and not for other LCHs, using the resources of the UL grant. In response to receiving an UL grant with a restriction (e.g., indicate a LCH for which the resources of the UL grant are allocated), the UE 904 may be configured to skip a transmission of data if there is no data available for the LCH, or may output a MAC-CE and/or padding, where the MAC-CE may indicate to the network entity 902 that the UE has data be transmitted for a different LCH.

At 922, the UE 904 may output a PUSCH to the network entity 902 having 100 bytes of voice data using a subheader without an LCID field, such as the subheader 700 in FIG. 7. Since the PUSCH has another 150 bytes of data, the UE 904 may transmit a MAC-CE with the PUSCH at 922 and pad the rest of the resources. In other words, if the TBS of the UL grant is larger than the MAC SDU size, the UE may include padding to meet the TBS size after any MAC-CE. The MAC-CE may indicate to the network entity 902 that there is still 100 bytes of SRB and 100 bytes of best effort data to be transmitted at 926. In response, at 924 the network entity 902 may output a UL grant of 200 bytes. The UL grant may not have any restriction associated with it. At 928, the UE 904 may output a PUSCH to the network entity 902 having 100 bytes of the SRB data and 100 bytes of the best effort data using a subheader with an LCID field, such as the subheader 500 in FIG. 5A. The UE 904 may multiplex MAC SDUs from the SRB and best effort LCHs by using the LCID field to identify each LCH.

In some aspects, the overhead reduced MAC subheader may be achieved through removal of the L field. Thus, in some aspects, a transmitter may transmit a MAC subheader than does not include length information. The removal of the L field may enable the overhead of the MAC subheader to be reduced to 1 byte. In some aspects, a UE may use this format, e.g., without the L field, for an LCH if the MAC SDU size (or RLC PDU/RLC SDU) corresponds to a configured size indicated by the network. As the network has indicated the size, the UE may skip sending the length information, and the network may be aware of the length of the MAC SDU based on the configured size. If the MAC SDU is not the configured size, the UE may include a MAC subheader that includes the L field. The network may indicate the configured size for the MAC SDU to the UE in any of various signaling, e.g., such as a PDCCH (e.g., in DCI), a C-RNTI, a transport channel, a MAC-CE, or an RRC message (e.g., in an LCH configuration). FIG. 10A illustrates an example MAC subheader 1000 that includes an LCID field 1006 and does not include an L field. The MAC subheader 1000 may also include an F1 field 1002 and a reserved field 1004. FIG. 10B illustrates an example in which a MAC subheader 1050 may be further reduced by using a short LCID field 1008 rather than the longer LCID field 1006 in FIG. 10A or eLCID field 540 in FIG. 5B. The short LCID may be similar to the short LCID described in connection with FIGS. 6A, and 6C. The F1 field 1002 may indicate that the format of the MAC subheader, i.e., whether the MAC subheader is a reduced subheader or a non-reduced subheader. The length of the LCID field or short LCID field may be configurable. As an example, the LCID field may be 6 bits. In some aspects, the network may indicate that an eLCID (*1) field is not used for the corresponding LCHs. In some aspects, a network may provide a mapping table between an LCID/eLCID and short LCID.

The UE may determine the LCH for which the UE is enabled to use this new format based on the LCID of the LCH. Without the length information and without the configured size, the NW may not accurately predict the MAC SDU size from the LCH. For example, for voice data, the packet size may change, e.g., between voice or a silence insertion descriptor (SID). If the TBS of the UL grant is larger than the MAC SDU size, the UE may include padding to meet the TBS size and may include the L field in the MAC subheader. In one aspect, if the TBS of the UL grant is larger than the MAC SDU size, the UE may use a MAC subheader that includes the L field, such as the subheader 500 in FIG. 5A or the subheader 530 in FIG. 5B, to include the L field in the MAC subheader.

Even without the L field in the subheader, the transmitter may be configured to multiplex multiple MAC SDUs (from the same or different LCHs) in a single MAC PDU, and the receiver may be configured to identify the length of each MAC SDU either implicitly or explicitly. For example, a network entity may be configured to identify the length of each MAC SDU by explicitly defining a length for each LCH in an RRC message, a MAC-CE, a PDCCH (DCI), a C-RNTI, or a transport channel. In another aspect, the network entity may be configured to identify the length of each MAC SDU by implicitly referring to a predefined table in a specification that indicates a predefined default length for each LCH. Such tables may change in response to a detected environmental condition trigger, such as a threshold rate of service (e.g., at most 49.5 kbps). Multiple LCHs may take the advantage of the reduced header size. For example, multiple RTP flows, voice and gaming, carrier aggregation (CA) based packet duplication, etc. may use the reduced header size, e.g., as long as the MAC SDU size is deterministic so that the network is able to identify the MAC SDU size when receiving a MAC PDU.

Figure 11A:
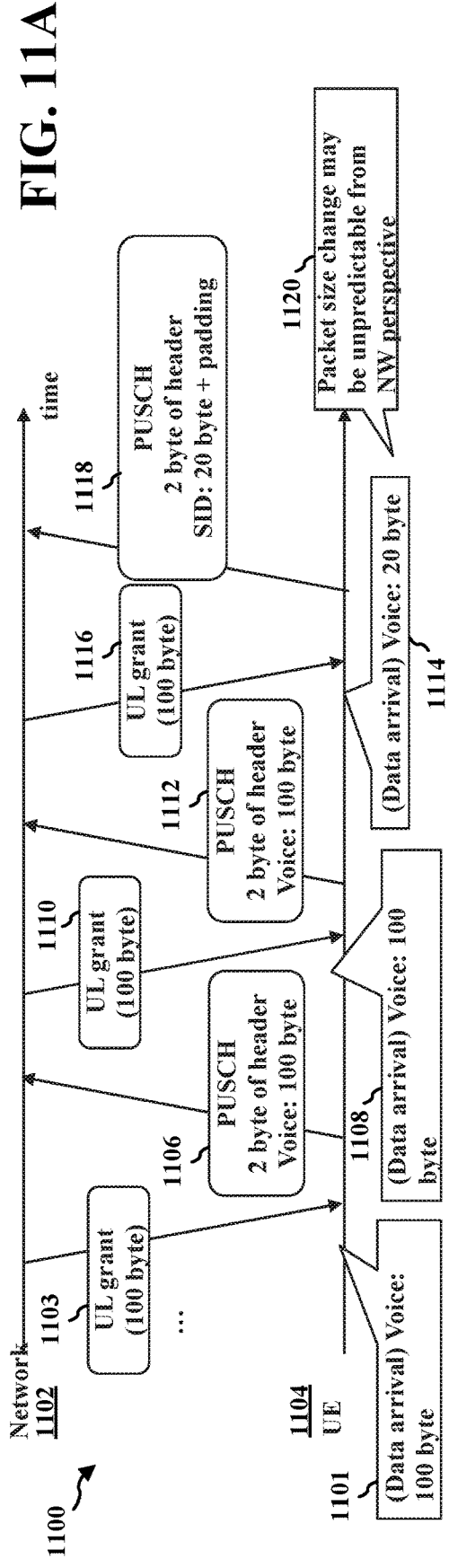
FIGS. 11A and 11B are communication flow diagrams between a UE and a network entity including overhead reduction as presented herein.

FIG. 11A illustrates an example communication flow diagram 1100 between a UE 1104 and a network entity 1102 in which the UE 1104 may transmit MAC subheaders with an L field, such as subheader 500 in FIG. 5A. At 1101, 100 bytes of voice data arrives for transmission. The UE 1104 may receive an uplink grant 1103 for 100 bytes and output a PUSCH transmission 1106 with the 100 bytes of voice data and a 2-byte header that includes length information. At 1108, 100 bytes of voice data arrives for transmission. The UE 1104 receives an uplink grant 1110 for 100 bytes and transmits a PUSCH transmission 1112 with the 100 bytes of voice data and a 2-byte header that includes length information. At 1114, 20 bytes of voice data arrives for transmission. The UE 1104 receives an uplink grant 1116 for 100 bytes and transmits a PUSCH transmission 1118 with the 20 bytes of voice data, a 2-byte header that includes length information, 20 bytes of SID and padding. The packet size may change, as shown at 1120, and the network entity 1102 may not be able to accurately predict a size of a MAC SDU that it obtains from the UE without an indication of the length information in a MAC subheader. The inclusion of the L field in the subheader, such as the L field 508 of the subheader 500 in FIG. 5A, may be used to inform the network of the size of the MAC SDU.

Figure 11B:
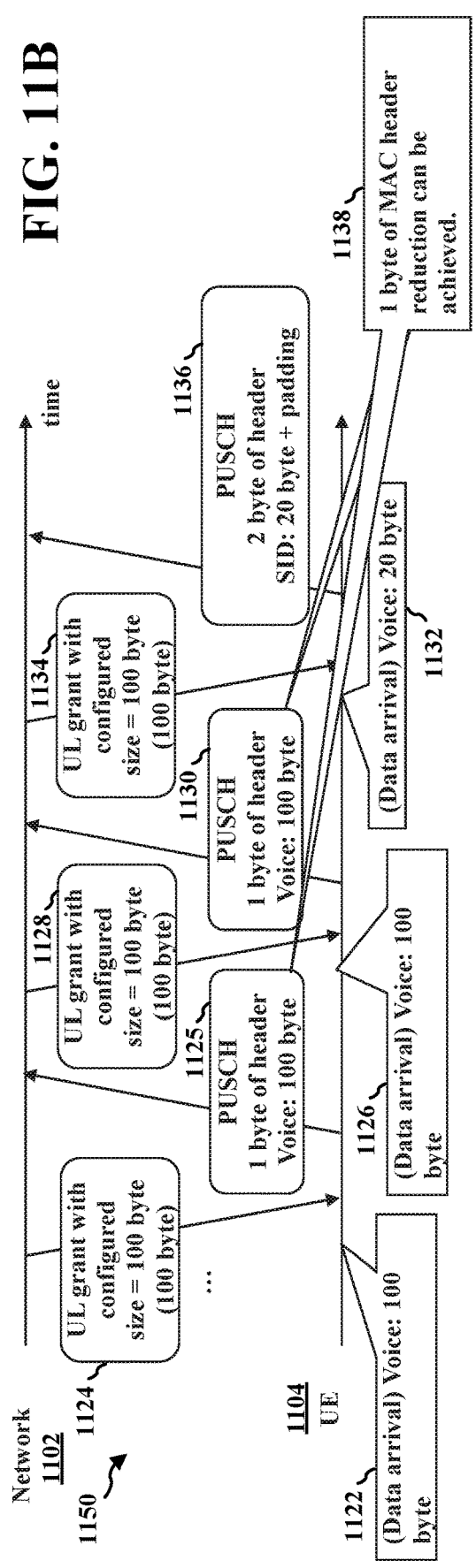

FIG. 11B illustrates an example communication flow diagram 1150 between the UE 1104 and the network entity 1102 in which the UE 1104 may be configured to transmit MAC subheaders without the L field, e.g., as described in connection with subheader 1000 in FIG. 10A and subheader 1050 in FIG. 10B. In FIG. 11B, the uplink grant 1124 provided by the network entity 1102 may have an associated size that enables the network to accurately identify the size of a MAC SDU that does not include length information in subheader. The size may be associated explicitly or implicitly. At 1122, 100 bytes of voice data arrives for transmission. The UE receives an uplink grant 1124 for 100 bytes and, in response, may be configured to output a PUSCH transmission 1125 with the 100 bytes of voice data and a 1-byte header that does not indicate length information, such as the subheader 1000 in FIG. 10A. As the grant 1124 is for 100 bytes, and the UE 1104 transmits 100 bytes of voice data, the network entity 1102 may be configured to identify the size of the MAC SDU based on the size indicated in the uplink grant 1124. At 1126, 100 bytes of voice data arrives for transmission. The UE receives an uplink grant 1128 for 100 bytes and, in response, may be configured to transmit a PUSCH transmission 1130 with the 100 bytes of voice data and a 1-byte header that does not indicate length information. As the grant 1128 is for 100 bytes, and the UE 1104 transmits 100 bytes of voice data, the network entity 1102 may be configured to identify the size of the MAC SDU based on the size indicated in the uplink grant 1128.

At 1132, 20 bytes of voice data arrive for transmission. The UE 1104 receives an uplink grant 1134 for 100 bytes and, in response, may be configured to transmit a PUSCH transmission 1136 with the 20 bytes of voice data, a 20 byte SID and padding, and a 2-byte header that indicates length information, such as the subheader 500 in FIG. 5A. The use of the 2-byte header by the UE 1104, which includes length information, enables the network entity 1102 to accurately determine the unexpected size of 20 bytes for the MAC SDU received from the UE 1104. As described at 1138, one byte of MAC header reduction may be achieved by using PUSCH transmission 1125 and PUSCH transmission 1130. The aspects described in connection with FIG. 11B may be applied for dynamic grants and configured grants. The grant size may be for the MAC SDU without considering the header size. The packet size in FIG. 11B is merely one example to illustrate the concept. The aspects may be applied for various sizes.

In some aspects, overhead reduction may be achieved for a MAC subheader by removing both the LCID field and the L field. In some aspects, the MAC subheader may be empty or no MAC subheader may be included with a MAC SDU. The size of MAC subheader may be reduced by removal of both the LCID field and the L field. For example, the overhead of the MAC subheader may be reduced down to 0 bytes. The removal of the LCID and L information may provide uncertainty at the receiving device, e.g., such as described in connection with FIGS. 8 and 11A, which may be resolved through one or more configurations as described herein.

As an example, due to the removal of LCID field, e.g., as explained in connection with FIGS. 8 and 9A, the receiver may not be able to identify the logical channel (LCH) of the MAC SDU if the UE has data for multiple LCHs. In order to address the uncertainty due to the removal of LCID field, any of the aspects described in connection with FIG. 9B may be applied.

As another example, due to the removal of the L field, e.g., as described in connection with FIG. 11A, the receiver may not be able to identify the length of the MAC SDU if the packet size changes over time, e.g., SID. For the issue due to removal of L field, any of the aspects described in connection with FIG. 11B may be applied. In an aspect where no header is included, the outputting device may be prevented from falling back to a non-reduced MAC subheader having the L field, such as the subheader 500 in FIG. 5A. Moreover, without a header, the MAC SDUs may not be multiplexed with MAC-CEs and padding. One or more configurations may be used to allow a receiving device to accurately determine an unexpected LCH or an unexpected length of a MAC SDU where the MAC SDU is not transmitted with an LCID field or an L field.

In a first aspect, in order to avoid uncertainty due to a removal of the L field from the MAC subheader, a UE may transmit the MAC SDU only when the TBS in UL grant fits. If the MAC SDU has a different size, e.g., does not does not fit the UL grant, the UE may transmit a scheduling request to a network entity to request an allocation of resources for the MAC SDU. In a second aspect, in order to avoid uncertainty due to a removal of the L field from the MAC subheader, a UE may be provided with multiple grants (e.g., dynamic grants and/or CGs) which may have different TBS relative to one another. The UE may select resources allocated in one of the multiple grants based on the MAC SDU size. The network may also be configured to blindly decode the MAC SDU. In a third aspect, the UE may be provided with a single grant that is associated with pre-configured multiple TBSs. The UE may select the TBS based on the MAC SDU size. The network may also be configured to blindly decode the MAC SDU. In a fourth aspect, the UE may perform padding such that the resulting PDCP SDU size becomes the configured size. The aspects may be applied at the same time or in combination. For example, the UE may use the fourth aspect together with the first, second or third aspect to reduce the number of packet size variations.

In the first aspect, the UE may transmit the MAC SDU when the TBS in UL grant fits (e.g., is the same size as) the MAC SDU size of the LCH and does not transmit the MAC SDU if the TBS in the UL grant does is a different size than the MAC SDU size of the LCH. The network entity may indicate to the UE the LCH for which the UL grant is to be used in a PDCCH (e.g., DCI), a C-RNTI, a transport channel, a MAC-CE, or an RRC configuration that the network entity transmits to the UE. The UE may be configured to be not allowed to use the UL grant for other LCHs, MAC-CE and padding. In response to the TBS being a different size than the MAC SDU size (or RLC PDU/SDU size), the UE may be configured to not transmit the PUSCH transmission in order to avoid having the network entity misinterpret the MAC PDU contents. In response to the TBS size being different than the MAC SDU size, the UE may be configured to send a scheduling request (SR) to the network entity requesting an allocation of resources to transmit the data. As another example, in response to the TBS size being different than the MAC SDU size, the UE may be configured to transmit a buffer status report (BSR) to the network entity, which may indirectly trigger a scheduling request transmission to the network entity. In some aspects, SR resources or PRACH resources may be associated with, be configured for, or be reserved for the purpose of requesting resources for a MAC SDU that is different than a TBS of a prior grant. By having particular SR or PRACH resources, the network entity may be able to distinguish such SR from other cases, e.g., when higher priority data arrives.

Figure 12:
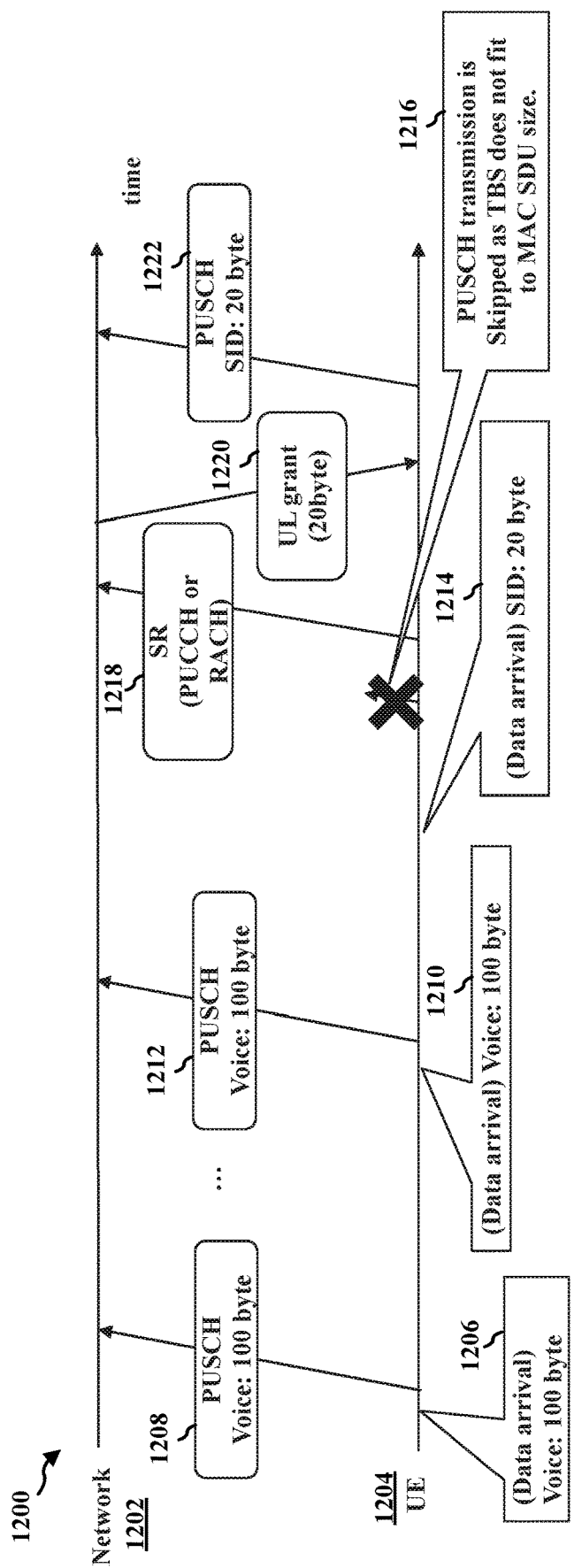
FIG. 12 is a communication flow diagram between a UE and a network entity including overhead reduction as presented herein.

FIG. 12 illustrates an example communication flow diagram 1200 between a UE 1204 and a network entity 1202 including example aspects of the UE 1204 skipping PUSCH transmission when the MAC SDU size is different than the TBS size of an uplink grant output by the network entity 1202. The CG may have an associated size of 100 bytes, and may be for a voice LCH. In FIG. 12, the network entity 1202 may provide the UE 1204 with a configured grant (CG) that provides a semi-static allocation of uplink resources to the UE 1204. At 1206, 100 bytes of voice data arrives at the UE 1204, and the UE 1204 transmits the 100 bytes of voice data in a PUSCH transmission 1208 to the network. The UE 1204 may be configured to transmit the PUSCH transmission 1208 with MAC overhead reduction in the MAC SDU(s) (i.e., does not include LCID information or L information in MAC subheader(s) for the MAC SDU(s)). At 1210, another 100 bytes if voice data arrives at the UE 1204, and the UE 1204 transmits the 100 bytes of voice data in a PUSCH transmission 1212 with MAC overhead reduction. At 1214, 20 bytes of SID arrives at the UE 1204. As described at 1216, the UE 1204 may skip the PUSCH transmission in the CG resources because the 20 bytes of voice data at 1214 are smaller than the 100 byte TBS associated with the CG resources. In addition, the data is not for a voice LCH. In other words, the data at 1214 does not have the preconfigured length and does not have the preconfigured LCH.

If the UE 1204 transmits data with a MAC overhead reduction configuration that does not include an LCID field or L field in the MAC subheader, the network entity 1202 may not be able to identify the size of the MAC SDU and/or the LCH if the UE 1204 transmits a PUSCH transmission similar to PUSCH transmission 1208 or PUSCH transmission 1212 to send the SID data at 1214. Instead, the UE 1204 may transmit an SR 1218, for example in a PUCCH or a random access channel (RACH). The SR may indicate a request an UL grant having a LCH and a preconfigured length, such as a 20-byte grant for an SID. In response, the network entity 1202 may provide the UE 1204 with an UL grant 1220 of resources for a 20-byte size for an SID LCH. In response, the UE 1204 may transmit output the 20 bytes of the SID in the PUSCH 1222.

The example in FIG. 12 may be similarly applicable to dynamic scheduling examples in addition to the configured grant example. The uplink grant size is for the MAC SDU and does not take into account the header size. The example of a 100-byte TBS is merely an example, and the aspects may be applied for any TBS size. Such an example may be useful for long voice calls using a network with a low rate of service to reduce protocol overhead.

In the second aspect, the network entity may provide the UE with multiple grants (whether dynamic grants and/or CGs) which have different TBS. The UE may then select resources of one of the multiple grants depending on the MAC SDU size that the UE has to output. The network entity may blindly decode the PUSCH transmission from the UE. Such blind decoding may increase the complexity of the network configuration, and the variation of packet size between one transmission and another transmission may be diverse depending upon the UE implementation (e.g., ROHC header size variation). The network entity may provide the UE with a sufficient number of grants to cover possible packet variants. As an example, the network entity may provide grants for large voice packets with no ROHC header, small voice packets with no ROHC header, large SID with no ROHC header, small SID with no ROHC header, control PDUs, etc. The network entity may indicate the LCH to the UE for which the UL grant is to be used. The indication to the UE may be in PDCCH (e.g., DCI), a C-RNTI, a transport channel, a MAC-CE, or an RRC configuration. The UE may not use the UL grant for other LCHs, for MAC-CE, or for padding. In response to the TBS of the UL grant being different than the MAC SDU size, the UE may skip the PUSCH transmission to avoid having the network entity misinterpret the MAC PDU contents. In response to there being no available UL grant having a TBS size and LCH for the MAC SDU, the UE may send an SR or BSR to the network requesting an allocation of resources to transmit the data. The UE may send the SR in response to there being no available UL grant for the MAC SDU size and LCH for a period of time. Such a configuration may be configured by the network entity either directly (e.g. 500 ms) or indirectly (e.g., 50% of packet delay budget (PDB)). The output of the SR or BSR may be as shown in FIG. 12, for example. If multiple grants overlap in the time domain, and the UE has multiple data with different sizes, the UE may be configured to follow a prioritization rule in order to determine which data to transmit. For example, the UE may transmit data in a first in first out (FIFO) manner. The UE may prioritize a data PDU over a control PDU. In other aspects, the UE may prioritize a control PDU over a data PDU.

Figure 13:
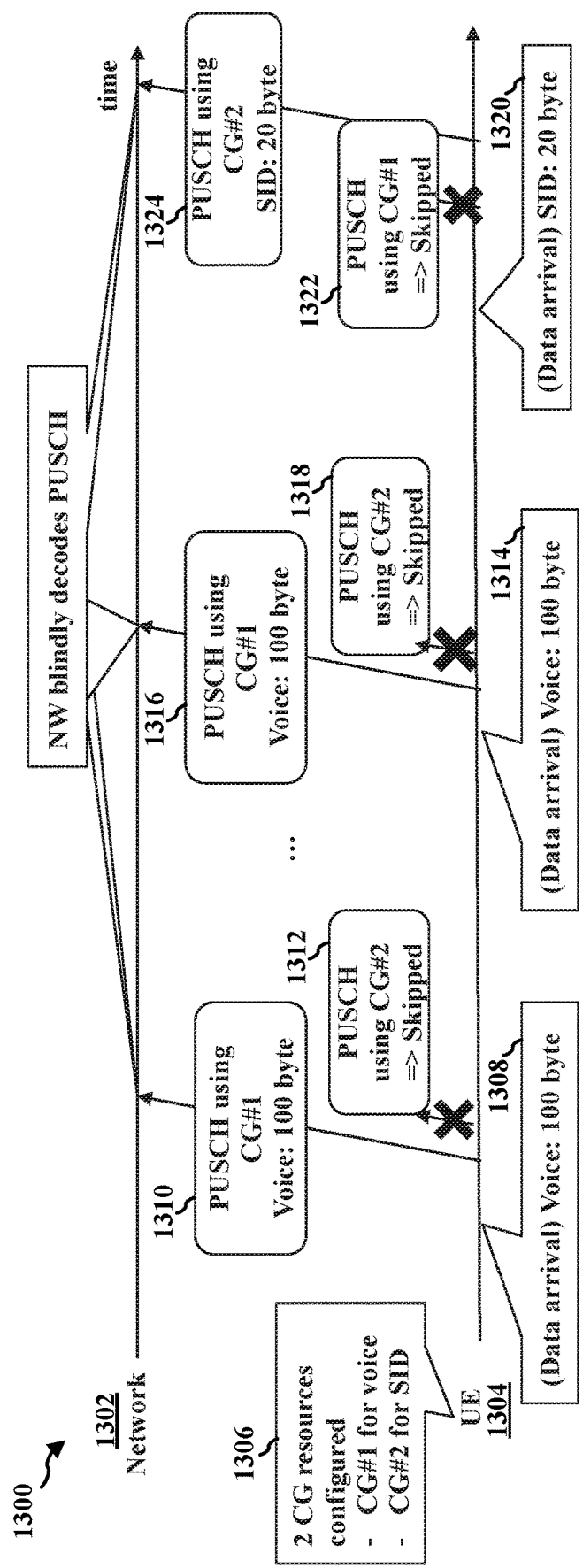
FIG. 13 is a communication flow diagram between a UE and a network entity including overhead reduction as presented herein.

FIG. 13 illustrates an example communication flow diagram 1300 between a UE 1304 and a network entity 1302. As shown at 1306, the network entity 1302 may provide the UE 1304 with multiple configured grants. For example, a first CG for voice data with overhead reduction (i.e., without LCID and L in a subheader) and a second CG for SID with overhead reduction. Each CG may also have a corresponding size, such as 100 bytes for voice data and 20 bytes for SID data. At 1308, 100 bytes of voice data arrives at the UE 1304, and the UE 1304 may transmit the 100 bytes of voice data in a PUSCH transmission 1310 to the network entity 1302 using resources of the first CG. At 1312, the UE 1304 may skip a PUSCH transmission in the resources of the second CG, as the UE does not have SID data to output. At 1314, 100 bytes of voice data arrives at the UE 1304, and the UE 1304 may transmit the 100 bytes of voice data in a PUSCH transmission 1316 to the network entity 1302. At 1318, the UE 1304 may skip a PUSCH transmission in the resources of the second CG, as the UE 1304 does not have SID data to output.

At 1320, 20 bytes of SID arrives at the UE 1304, and in response the UE 1304 may transmit the 20 bytes of SID in a PUSCH transmission 1324 to the network entity 1302 using resources of the second CG. At 1322, the UE 1304 may skip a PUSCH transmission in the resources of the first CG, because the UE 1304 does not have voice data of the corresponding size to transmit. The aspects of FIG. 13 may be similarly applicable to dynamic UL grants of resources. The UL grant is for the MAC SDU size and does not take into account the header size. The example sizes in FIG. 13 are merely examples to illustrate the concept, and the aspects may be applied to CGs for any size of MAC SDUs. Each of the PUSCH transmissions may be without an LCID field or L field in a MAC subheader.

The aspect shown in communication flow diagram 1300 in FIG. 13 may require a large amount of network complexity due to PUSCH blind decoding. The variation in packet size may be diverse depending upon the UE implementation (e.g. ROHC header size variation). To reduce the amount of resources a network uses to process incoming transmissions, the UE may be configured to transmit assistant information before transmitting a PUSCH transmission. In other words, the network may decode PUSCH in two steps, which enables the network to decode only the valid subset of TBS candidates. The network may indicate/configure TBS candidates to the UE via one or more UL grants (whether dynamic grants and/or CGs), and the UE may transmit a selection of the TBS candidates to the network. Moreover, the UE may be configured with UL resources, each of which is associated with each TBS. or TBS group(s) associated to multiple TBS candidates. The network may assign the UL resources in a time domain before the transmission opportunities of the corresponding PUSCH resources. The UE may use any suitable UL resource, such as a PRACH, a PUCCH, or an SRS, as a UL channel or an UL signal for an UL resource. When the UE triggers such a transmission, such as a PUSCH transmission, the UE may also trigger an UL transmission using the corresponding UL resource. The NW first decodes the UL resource to determine the TBS or TBS group of the corresponding PUSCH, before receiving the PUSCH, which the network now knows contains what type of TBS or TBS group. UE may also report the supported or unsupported gap in the time domain between the UL resources and the PUSCH transmission.

Figure 14:
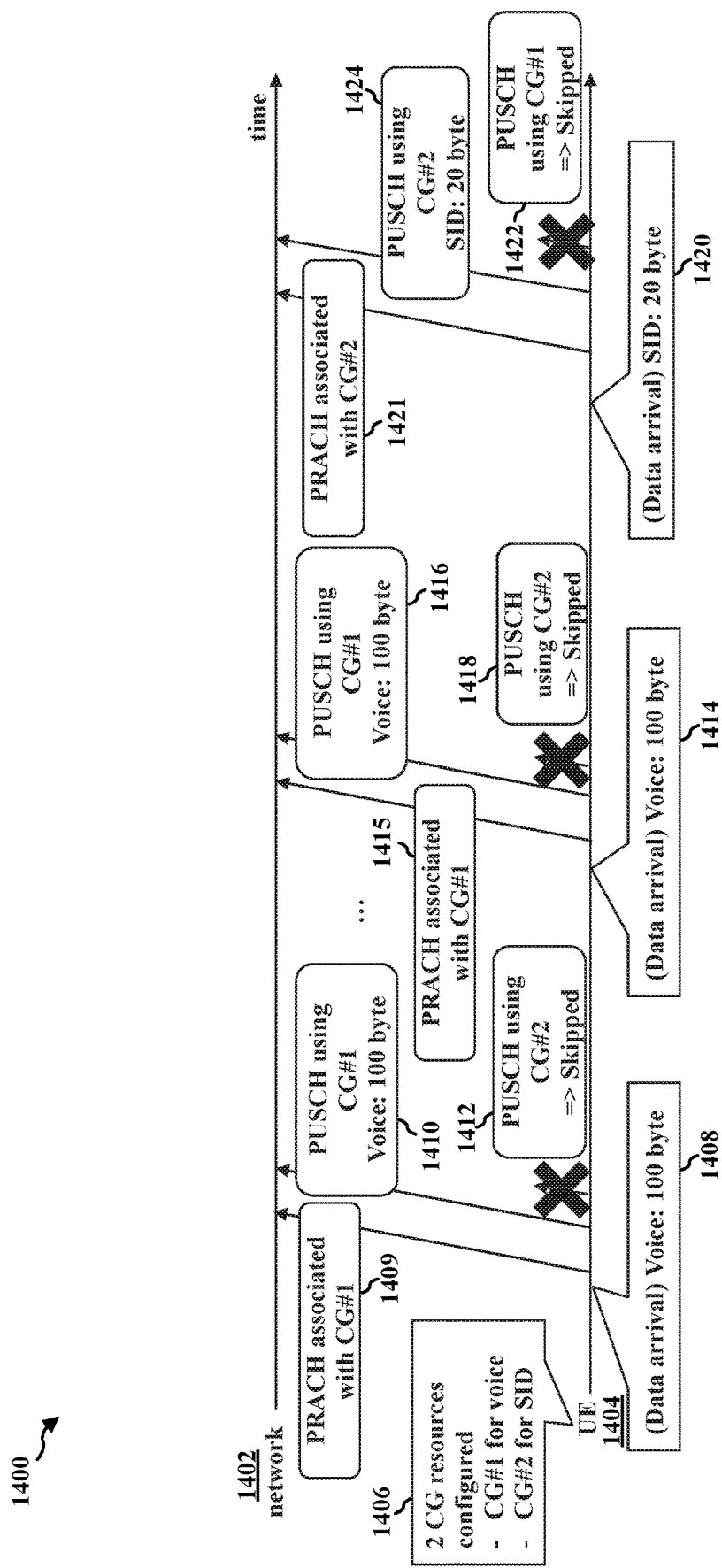
FIG. 14 is a communication flow diagram between a UE and a network entity including overhead reduction as presented herein.

FIG. 14 illustrates another example communication flow diagram 1400 between a UE 1404 and a network entity 1402, where the UE 1404 may be configured to transmit assistant information, such as PRACH transmission 1409, before transmitting a PUSCH transmission, such as PUSCH transmission 1410. Similar to 1306 in FIG. 13, as shown at 1406, the network entity 1402 may provide the UE 1404 with one or more CGs. At 1408, 100 bytes of voice data arrives at the UE 1404. The UE 1404 may be configured to transmit a PRACH transmission 1409 associated with CG #1 to the network entity 1402, indicating to the network entity 1402 that the UE 1404 has selected the TBS or the TBS group of the first CG to use to transmit a PUSCH. The PRACH transmission 1409 may also comprise a supported gap in the time domain between the PRACH transmission 1409 and the PUSCH transmission 1410. While the UE 1404 is shown as transmitting a PRACH transmission 1409 to the network entity 1402, the UE 1404 may be configured to use any suitable UL resource, such as a PUCCH transmission or an SRS transmission. The UE may then transmit the 100 bytes of voice data in a PUSCH transmission 1410 to the network entity 1402 using resources of the first CG. At 1412, the UE 1404 may skip a PUSCH transmission in the resources of the second CG, as the UE does not have SID data to output. Since the network entity 1402 has received the PRACH transmission associated with the first CG, the network entity 1402 does not blind decode the PUSCH transmission 1410, as it knows the parameters of the PUSCH transmission 1410.

Similarly, at 1414, 100 bytes of voice data arrives at the UE 1404, and in response the UE 1404 may transmit a PRACH transmission 1415 associated with the first CG and the 100 bytes of voice data in a PUSCH transmission 1416 to the network entity 1402. At 1418, the UE 1404 may skip a PUSCH transmission in the resources of the second CG, as the UE 1404 does not have SID data to output. The network entity 1402 may know that the UE 1404 is transmitting the PUSCH transmission 1416 using the first CG, and is not transmitting the PUSCH transmission at 1418 of the second CG in response to receiving the PRACH transmission 1415 associated only with the first CG.

At 1420, 20 bytes of SID arrives at the UE 1404, and in response the UE 1404 may transmit the PRACH transmission 1421 associated with the first CG to the network entity 1402 and may transmit the 20 bytes of SID in a PUSCH transmission 1424 to the network entity 1402 using resources of the second CG. At 1422, the UE 1404 may skip a PUSCH transmission in the resources of the first CG, because the UE 1404 does not have voice data of the corresponding size to transmit. The aspects of FIG. 14 may be similarly applicable to dynamic UL grants of resources. The UL grant is for the MAC SDU size and does not take into account the header size. The example sizes in FIG. 14 are merely examples to illustrate the concept, and the aspects may be applied to CGs for any size of MAC SDUs. Each of the PUSCH transmissions may be without an LCID field or L field in a MAC subheader.

In the third aspect, a network entity may configure multiple TBSs for the UE. The network entity may provide the UE with a single uplink grant (whether dynamic grant or CG) associated with the configured multiple TBSs. The UE may select a TBS for use in the resources of the UL grant depending on a MAC SDU size that the UE is to transmit. The network entity may blindly decode the transmission from the UE. Similar to the example of multiple grants described in connection with the second aspect, the network entity may provide the UE with a number of TBS variations to cover the possible packet variants. As an example, the network entity may configure TBSs for large voice packets with no ROHC header, small voice packets with no ROHC header, large SID with no ROHC header, small SID with no ROHC header, control PDUs, etc. The network entity may indicate the LCH to the UE for which the UL grant is to be used. The indication to the UE may be in PDCCH (e.g., DCI), a C-RNTI, a transport channel, a MAC-CE, or an RRC configuration. If there is no available UL grant and configured TBS size for the LCH for the MAC SDU, the UE may send an SR or BSR to the network requesting an allocation of resources to transmit the data. The UE may send the SR if there are no available UL grant resources for the MAC SDU size and LCH for a period of time, which may be configured by the network, may be 50% of packet delay budget (PDB), etc. The transmission of the SR or BSR may be as shown in the communication flow diagram 1200 in FIG. 12, for example.

Figure 15:
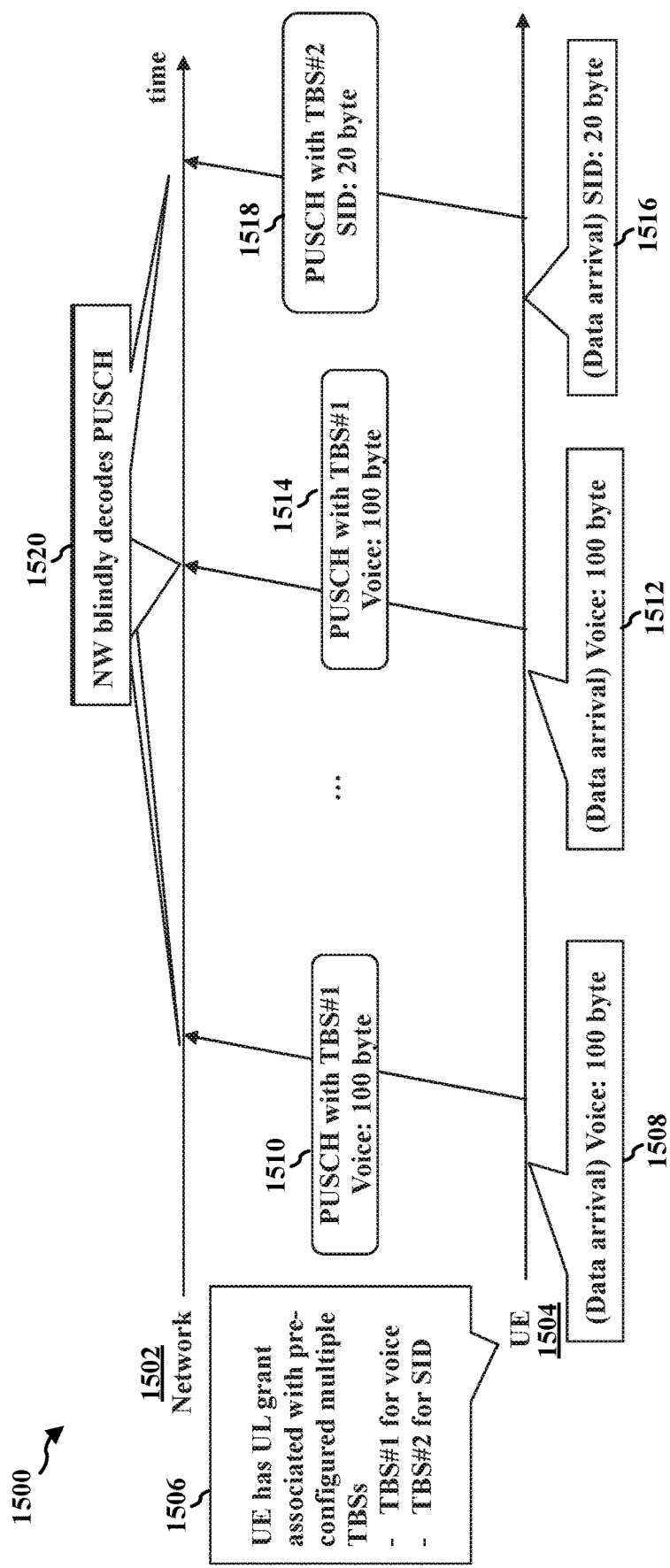
FIG. 15 is a communication flow diagram between a UE and a network entity including overhead reduction as presented herein.

FIG. 15 illustrates an example communication flow diagram 1500 between a UE 1504 and a network entity 1502 in which the network entity 1502 provides the UE 1504 with an uplink grant that is associated with multiple TBSs (e.g., a first TBS of 100 bytes for data and a second TBS of 20 bytes for SID) that are previously configured for the UE 1504, as shown at 1506. At 1508, 100 bytes of voice data arrives at the UE 1504, and, in response, the UE 1504 may transmit the 100 bytes of voice data in a PUSCH transmission 1510 to the network entity 1502 using resources of the UL grant and the first TBS. At 1512, 100 bytes of voice data arrives at the UE 1504, and, in response, the UE 1504 may transmit the 100 bytes of voice data in a PUSCH transmission 1514 to the network entity 1502 using the resources of the uplink grant and the first TBS. At 1516, 20 bytes of SID arrive at the UE 1504, and, in response, the UE 1504 may transmit the 20 bytes of SID in the PUSCH transmission 1518 and the second TBS of 20 bytes of SID. Each of the PUSCH transmissions may be without an LCID field or L field in a MAC subheader.

As described in 1520, the network entity 1502 may be configured to blindly decode the PUSCH transmissions 1510, 1514, and 1518. The network entity 1502 may recognize the LCH based on the TBS that the network entity decodes. For example, in response to the network entity 1502 blindly decoding the PUSCH transmission 1510 with the first TBS having 100 bytes of data, the network entity 1502 may recognize that the first TBS is associated with voice and process the decoded data accordingly. In response to the network entity 1502 blindly decoding the PUSCH transmission 1518 with the second TBS having 20 bytes of data, the network entity 1502 may recognize that the second TBS is associated with SID and process the decoded data accordingly. The example in FIG. 15 may be applicable to dynamic grants and CGs. The uplink grant size is for the MAC SDU without taking into account the size of the header. The packet sizes in the example are merely examples to illustrate the concept, and the concept may be applied for various sizes.

The TBSs signaled by the network entity may vary from time to time. In other words, a network entity may be configured to dynamically change the configuration of the network indication provided to the UE. In one aspect, the network entity may be configured to provide a first UL grant having a first TBS configuration at a first time and a second UL grant having a second TBS configuration at a second time. For example, the network entity may be configured to provide an UL grant having a first TBS of 100 bytes for voice and a second TBS of 20 bytes for SID for a first time period, and then provide an UL grant having a first TBS of 200 bytes for voice, a second TBS of 100 bytes for best effort, and a third TBS of 20 bytes for SID for a second time period. In another aspect, the UE may be preconfigured with a plurality of TBS groups, each having a reference index that may be selected by the network entity between one time period and another time period. For example, the network entity may output an RRC configuration to a UE having a first set of TBSs, each associated with a LCH, and a second set of TBSs, each associated with an LCH, and the network entity may output an UL grant to the UE during a first time period to select the first set of TBSs and output an UL grant to the UE during a second time period to select the second set of TBSs.

The aspect shown in communication flow diagram 1500 in FIG. 15 may require a large amount of network complexity due to PUSCH blind decoding. The variation in packet size may be diverse depending upon the UE implementation (e.g. ROHC header size variation). To reduce the amount of resources a network uses to process incoming transmissions, the UE may be configured to transmit assistant information before transmitting a PUSCH transmission. In other words, the network may decode PUSCH in two steps, which enables the network to decode only the valid subset of TBS candidates. The network may indicate/configure TBS candidates to the UE via one or more UL grants (whether dynamic grants and/or CGs), and the UE may transmit a selection of the TBS candidates to the network. Moreover, the UE may be configured with UL resources, each of which is associated with each TBS. The network may assign the UL resources in a time domain before the time domain of the corresponding PUSCH resources. The UE may use any suitable UL resource, such as a PRACH, a PUCCH, or an SRS, as a UL channel or an UL signal for an UL resource. When the UE triggers such a transmission, such as a PUSCH transmission, the UE may also trigger an UL transmission using the corresponding UL resource. The NW first decodes the UL resource to determine the TBS of the corresponding PUSCH, before receiving the PUSCH, which the network now knows contains what type of TBS. UE may also report the unsupported gap in the time domain between the UL resources and the PUSCH transmission.

Figure 16:
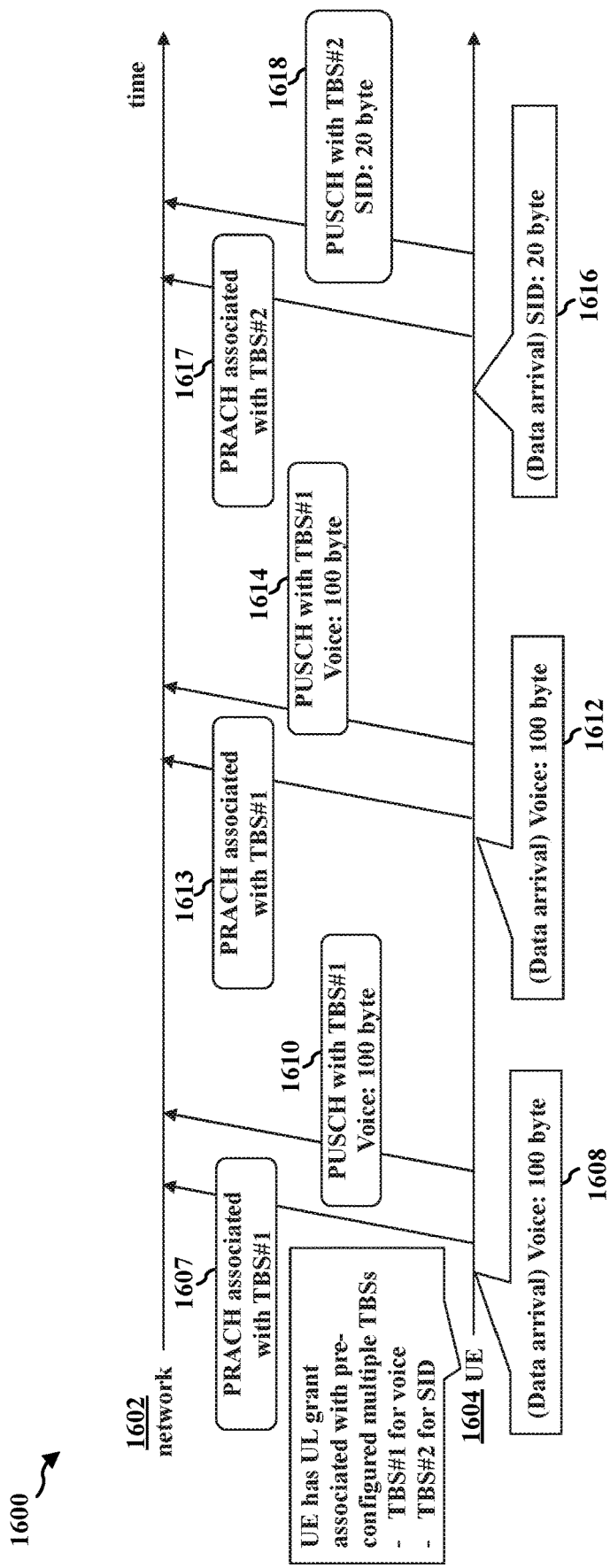
FIG. 16 is a communication flow diagram between a UE and a network entity including overhead reduction as presented herein.

FIG. 16 illustrates an example communication flow diagram 1600 between a UE 1604 and a network entity 1602 similar to example communication flow diagram 1500 in FIG. 15, where the UE 1604 is configured to transmit assistant information before the PUSCH transmission to relax NW processing power requirements. The network entity 1602 may be configured to provide the UE 1604 with an uplink grant that is associated with multiple TBSs (e.g., a first TBS of 100 bytes for data and a second TBS of 20 bytes for SID) that are previously configured for the UE 1604. At 1608, 100 bytes of voice data arrives at the UE 1604, and, in response, the UE 1604 may transmit the PRACH transmission 1607 associated with the first TBS to the network entity 1602 and may transmit the 100 bytes of voice data in a PUSCH transmission 1610 to the network entity 1602 using resources of the UL grant and the first TBS. The network entity 1602 does not need to be configured to blind decode the PUSCH transmission 1610 since the PRACH transmission 1607 identifies the first TBS as the selected TBS to the network entity 1602. At 1612, 100 bytes of voice data arrives at the UE 1604, and, in response, the UE 1604 may transmit the PRACH transmission 1613 associated with the first TBS to the network entity 1602 and the UE 1604 may transmit the 100 bytes of voice data in a PUSCH transmission 1614 to the network entity 1602 using the resources of the uplink grant and the first TBS. At 1616, 20 bytes of SID arrive at the UE 1604, and, in response, the UE 1604 may transmit the PRACH transmission 1617 associated with the second TBS to the network entity 1602 and the UE 1604 may transmit the 20 bytes of SID in the PUSCH transmission 1618 and the second TBS of 20 bytes of SID. Each of the PUSCH transmissions may be without an LCID field or L field in a MAC subheader.

The network entity 1602 may not need to be configured to blindly decode the PUSCH transmissions 1610, 1614, and 1618 since the network entity receives PRACH transmissions 1607, 1613, and 1617, respectively, that identify the TBS used by the UE 1604. The example in FIG. 16 may be applicable to dynamic grants and CGs. The uplink grant size is for the MAC SDU without taking into account the size of the header. The packet sizes in the example are merely examples to illustrate the concept, and the concept may be applied for various sizes.

In the fourth aspect, the bearer/PDCP entity may be configured with the threshold of the resulting PDCP PDU (or SDU). When building the PDCP PDU, in response to the resulting PDCP PDU size being less than the threshold, the PDCP entity may be configured to add padding such that the resulting PDCP PDU size is equal to the size threshold. In the PDCP header, a new field (e.g., a P field) may be introduced to indicate whether or not padding is included in the PDCP. The padding can be included after a data part or a MAC-I part, for example. At the receiver side, the PDCP entity may be configured to remove any added padding in response to the P field indicating that padding is included in the PDCP. The removal of the padding may be performed at a PDCP processing stage, e.g., before or after a count value estimation, header removal, deciphering, decompression, or integrity verification. Padding in other layers, such as an RLC, may also be possible as an alternative, e.g., if RLC header is included. In such an aspect, a P field may be included in the RLC header.

FIG. 17A illustrates a diagram 1700 of an example PDCP PDU having octets 1 to N. The PDCP header 1721 of the PDCP PDU may have octet 1 and octet 2, where a 12-bit SN spans the last 4 bits of octet 1 (a first PDCP SN field) and the 8 bits of octet 2 (a second PDCP SN field). The D/C bit field 1702 of Octet 1 may include a D/C field used to indicate whether the corresponding PDCP PDU is a PDCP Data PDU or a PDCP Control PDU. The reserved bit field 1704, reserved bit field 1706, and reserved bit field 1708 may be reserved bit fields that may be repurposed in a different specification. The 4-bit PDCP SN field 1710, and 8-bit PDCP SN field 1712 may be used to store a 12-bit PDCP SN. The payload data may be stored in data fields, such as data field 1714 from octet 3 to octet N−4. Octets N to N−3 may include the payload for the PDCP PDU, which may include any number of bytes suitable for a payload, such as a 100 byte voice data payload or a 20 byte silence insertion descriptor (SID) data payload. The PDCP PDU may also have a series of optional message authentication code for integrity (MAC-I) fields 1716, 1717, 1718, and 1719 that may be used to verify an integrity of a PDCP Data PDU. The diagram 1700 is used to illustrate an example MAC PDU having a minimal 2-byte PDU header size. Aspects may use other MAC PDUs having larger or smaller PDU header sizes, or other fields of different sizes than shown in diagram 1700.

FIG. 17B illustrates a diagram 1750 of an example PDCP PDU in which an Octet 3 may include an L field 1713 having a value that indicates a length of data, data and MAC-I, padding, or data, MAC-I and padding. The L field 1713 may be 0 dependent on a size threshold and the actual length of the data. In some aspects, if the length of the L field is 1 byte, the size threshold may be up to 256 bytes. FIG. 17B illustrates that padding 1720 may be added to the PDCP PDU if the data is less than a size threshold. The padding may increase the size of the PDCP PDU to the size threshold. A field, such as the P field 1703, may indicate whether or not the PDCP PDU includes padding. For example, P=0 may indicate that there is no padding and the L field 1713 and padding 1720 are not included in the PDCP PDU. If P=1, it may indicate that the PDCP PDU includes the L field 1713 and padding 1720.

In some aspects, the placement of the MAC subheader within the MAC PDU may be based on a type of the MAC subheader. Thus, the placement or location of the MAC subheader within the MAC PDU may indicate the type of MAC subheader. As an example, the MAC SDU for the configured LCH may be placed at the beginning of the MAC PDU for a reduced overhead MAC subheader. FIG. 18A illustrates an example 1800 of the MAC subheader 1808 placement after the MAC SDU 1806 within a MAC subPDU 1802 or 1804. In contrast, in FIG. 5C, the subheader 556, e.g., a non-reduced subheader, is shown as being placed before the MAC SDU 558. Another example placement of the overhead reduced subheader may include a placement just before a MAC-CE, a placement relative to a last MAC SDU, a placement just before padding or a placement after padding within a MAC PDU.

In some aspects, the resources used for the MAC SDU may be based on a type of the MAC subheader. For example, a time or frequency resource of the MAC SDU or PDU may indicate the type of MAC subheader. The MAC SDU for the configured LCH may be included in the corresponding UL grant. FIG. 18B illustrates an example 1850 in which the MAC PDU 1806 is transmitted within a time resource allocated for transmission of the reduced overhead MAC subheader. The frequency/time information, ID (e.g., RNTI) or associated channel (e.g., transport channel, physical channel) of UL resources for the MAC PDU can indicate the LCID of the MAC SDU. The corresponding resources can be indicated in an RRC message, a control PDU, a MAC-CE, a DCI, a C-RNTI and/or a transport channel. The indication may individually address each grant or may indicate a correspondence on a time or frequency basis (e.g., which may be applicable for a configured grant (CG)).

In some aspects, multiplexing of the MAC SDUs or MAC-CE may be restricted to the same MAC PDU. Restricting the variation of the contents in a MAC PDU may be beneficial from a receiving processing point of view. For example, multiplexing of the MAC SDUs may be limited to a MAC-CE and padding or may be limited to multiplexing with padding. In some aspects, multiplexing may be limited to a same type of format, e.g., to MAC SDUs with reduced overhead subheaders or to MAC SDUs with non-reduced overhead MAC subheaders. FIG. 18C illustrates an example 1875 in which the MAC PDU includes MAC SDUs having reduced overhead MAC subheaders.

Figure 19:
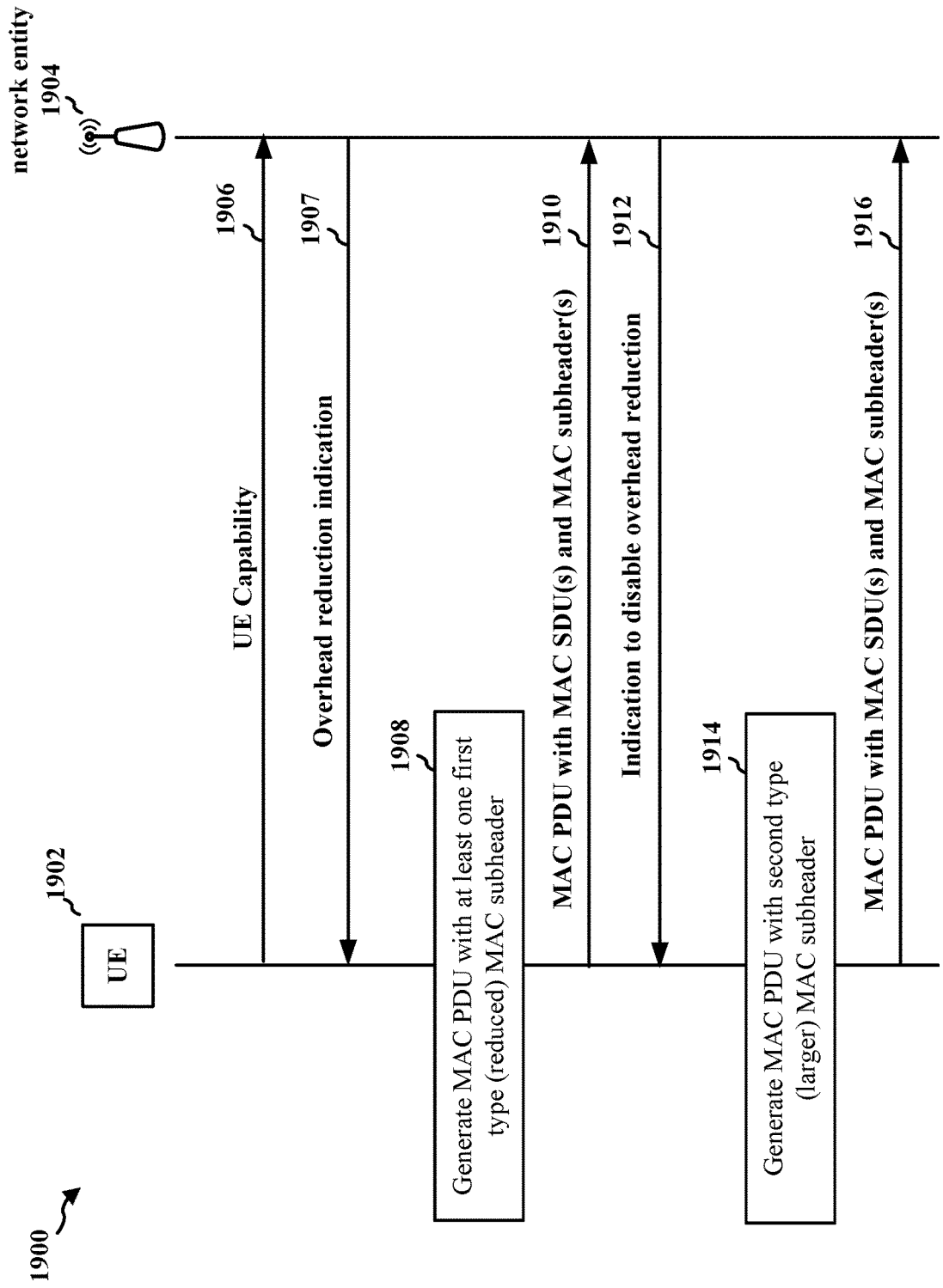
FIG. 19 is a communication flow diagram between a UE and a network entity including overhead reduction as presented herein.

In some aspects, a protocol reduction may be applied based on a UE's support for, e.g., a UE capability for, the type of protocol reduction. protocol enhancement for overhead reduction in, there is a possibility that part of them is not implementer or tested. Thus, there could be several options to indicate this to the network. In some aspects, the UE may have a separate capability for MAC reduction and PDCP reduction, or for RLC or SDAP reduction. FIG. 19 illustrates that the UE 1902 may indicate support for a UE capability to the network entity 1904, at 1906. The UE 1902 may indicate support individually for MAC reduction and PDCP reduction. As an example, the UE may indicate support for MAC reduction but not PDCP reduction. The UE may indicate support for PDCP reduction and not MAC reduction. The UE may indicate support for PDCP reduction and support for MAC reduction. A separate capability may be defined for the individual types of reduction and for a combination of the reductions (e.g., MAC, RLC+PDCP, SDAP). In some aspects, the UE may indicate a common capability for protocol reduction that includes, or corresponds in common, to multiple types of reduction, such as MAC reduction and PDCP reduction. In some aspects, the capability may be associated with a direction of communication or with a type of communication. For example, the UE may indicate support for DL MAC reduction and/or PDCP reduction. The UE may indicate support for UL MAC reduction and/or PDCP reduction. The UE may indicate support for sidelink MAC and/or PDCP reduction.

In some aspects, a device, such as a UE may implement protocol reduction (e.g., MAC reduction and/or PDCP reduction) as described herein in response to an overhead reduction command. As an example, FIG. 19 illustrates a network entity 1904 transmitting an indication 1907 to the UE 1902 enabling a protocol reduction, such as a MAC subheader reduction as described herein. The indication may be provided in control information such as DCI, a MAC-CE, and/or RRC signaling. Separate signaling may be used to enable or disable different types of protocol reduction. For example, a first signal may enable MAC reduction, a second signal may enable PDCP reduction, and a third signal may enable MAC and PDCP reduction. Separate signaling may be defined for enabling/disabling combinations of protocol reduction (e.g., MAC, RLC+PDCP, SDAP). In some aspects, common signaling may be used to enable or disable multiple types of protocol reduction. For example, a single indication may enable or disable MAC, RLC+PDCP, and SDAP reduction in common. In some aspects, the signaling may be associated with a direction of communication or with a type of communication. For example, the signaling may enable or disable DL MAC reduction and/or PDCP reduction. The signaling may enable or disable UL MAC reduction and/or PDCP reduction. The signaling may enable or disable sidelink MAC and/or PDCP reduction.

FIG. 19 also illustrates an example indication at 1912 disabling the overhead reduction. In response, the UE 1902 may generate a MAC PDU with a non-reduced MAC subheader, at 1914, and may transmit the MAC PDU at 1916.

The communication flow 1900 in FIG. 19 illustrates an example of a UE 1902 that transmits data to a network entity 1904 in MAC PDUs that include one or more MAC SDUs with overhead reduction based on any of the aspects presented in connection with FIGS. 4-16. As illustrated at 1908, the UE generates a MAC PDU that includes reduced overhead. For example, the MAC PDU 1910 may include a MAC subheader that includes reduced, or compressed, LCID information and/or length information, such as described in connection with any of FIGS. 6A-6C. The MAC PDU 1910 may include a MAC subheader that does not include LCID information, e.g., as described in connection with FIGS. 7 and 9B. The MAC PDU 1910 may include a MAC subheader that does not include length information, e.g., as described in connection with FIGS. 10A, 10B, and 11B. The MAC PDU 1910 may not include LCID information or length information as overhead, e.g., as described in connection with any of FIGS. 12-15B. The MAC PDU 1910 may include aspects described in connection with any of FIGS. 18A-16C. Based on a triggering condition, the UE 1902 may transmit another MAC PDU at 1916 with non-reduced overhead, e.g., which indicates LCID information and length information. In some aspects, the triggering condition may be the size of the MAC SDU to be transmitted, e.g., as described in connection with any of FIG. 11B or 12 and/or may be based on an LCH of the transmission. In some aspects, the use of the second type of MAC subheader may be based on an indication from the network, such as an indication disabling the overhead reduction, at 1912. The UE 1902 may generate a MAC PDU with a larger MAC subheader, as illustrated at 1914, and may transmit the MAC PDU at 1916 with a MAC subheader such as described in connection with FIG. 5A or 5B.

Figure 20:
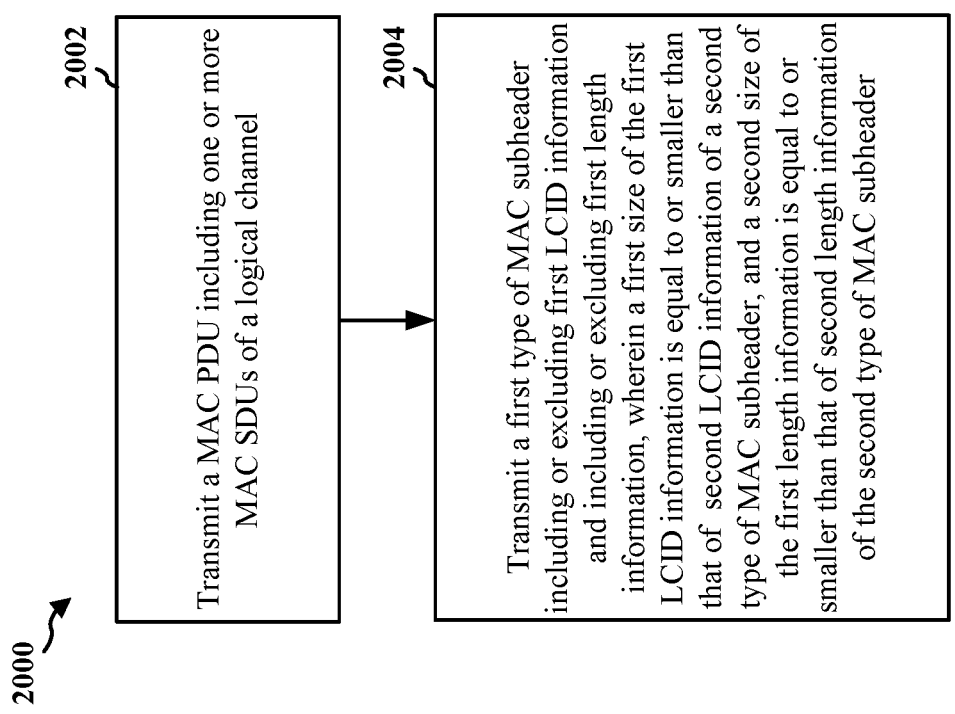
FIG. 20 is a flowchart of a method of wireless communication including overhead reduction as presented herein.

FIG. 20 is a flowchart 2000 of a method of wireless communication. In some aspects, the method may be performed by a UE (e.g., the UE 104, 350, 804, 904, 1104, 1204, 1304, 1504, 1902; the apparatus 2204). The method may enable a reduction of overhead by providing for a reduced MAC subheader.

At 2002, the device transmits a MAC PDU including one or more MAC SDUs of a logical channel. The transmission may be performed by the protocol reduction component 198 described in connection with FIG. 1, FIG. 3, or FIG. 22. Example aspects of MAC PDU transmission are described in connection with FIGS. 4-17.

At 2004, the device transmits a first type of MAC subheader including or excluding first LCID information and including or excluding first length information, where a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader. The transmission may be performed by the protocol reduction component 198 described in connection with FIG. 1, FIG. 3, or FIG. 22.

In some aspects, the first type of MAC subheader includes the first LCID information that has a first size that is smaller than the second size of the second LCID information of the second type of MAC subheader, and the first type of MAC subheader includes the first length information that has the third size that is smaller than the fourth size of the second length information of the second type of MAC subheader. As an example, FIGS. 6A-6C illustrate example aspects of the first type of MAC subheader. The size of the first LCID information and the first length information may be based on a rule, e.g., a defined length or other explicit length, or may be based on content of the MAC PDU, e.g., an implicit length. A configuration for the logical channel may allow the use of the first type of MAC subheader and may configure the logical channel with an identify used as the first LCID information in the first type of MAC subheader. The MAC PDU may include at least one of: multiple SDUs for different logical channels, a MAC-CE, or padding. In some aspects, the device may transmit the second type of MAC subheader in response to a request to transmit LCID information that is larger than an LCID field size for the first type of MAC subheader or length information that is larger than a length field size for the first type of MAC subheader.

In some aspects, the first type of MAC subheader may include a field that indicates a format for the first type of MAC subheader. For example, the F1 field, or another field may indicate the type of subheader, e.g., a reduced size subheader.

In some aspects, the device may transmit the second type of MAC subheader in response to a request to perform at least one of following: transmit a MAC SDU of the logical channel without use of the first type of MAC subheader, transmit the MAC SDU of the logical channel of which a fifth size of third LCID information is larger than the first size of the first LCID information, transmit the MAC SDU having an SDU size larger than a maximum size supported by the first length information, or transmit the MAC PDU including multiple SDUs of different logical channels.

In some aspects, the first type of MAC subheader does not include the first LCID information, and includes the first length information. For example, FIG. 7 illustrates an example of a MAC subheader without an LCID. The MAC PDU may include at least one of: multiple SDUs for a same logical channel, a MAC-CE, or padding. In some aspects, the device may transmit the second type of MAC subheader in response to a request to transmit a MAC PDU including multiple SDUs for different logical channels. FIG. 9B illustrates aspects of communication that the device may use for transmitting the MAC PDU. In some aspects, the device may receive an allocation of resources for the MAC PDU, the allocation indicating the logical channel associated with the resources, wherein the one or more SDUs for the MAC PDU are for the logical channel associated with a resource on which the MAC PDU is transmitted. The allocation of the resources may be indicated in at least one of RRC signaling, or control information in a PDCCH, such as DCI. In some aspects, the device may transmit a MAC-CE requesting a second allocation of resources indicating a second logical channel associated with the second allocation of resources. In response, the device may receive the second allocation of resources and transmit the second type of MAC subheader using the second allocation of resources in response to receiving the second allocation of resources.

In some aspects, the first type of MAC subheader may include the first LCID information and not include the first length information. FIGS. 10A and 10B illustrate aspects of first type of MAC subheader that does not include length information. In some aspects, the device may receive, from a network entity, a configuration of a first L of the one or more MAC SDUs. The device may transmit the second type of MAC subheader in response to a request to transmit a MAC SDU having a second L different from the first L. FIG. 11B illustrates example aspects that the UE may use in connection with transmitting the MAC PDU. The first type of MAC subheader may be associated with a MAC SDU size. For example, in FIG. 11B, the UL grant is for SDUs of 100 bytes. In some aspects, the MAC PDU may include multiple SDUs for different logical channels.

In some aspects, the first type of MAC subheader does not include the first LCID information and does not include the second length information or has zero size. For example, the device may not include any information in a MAC subheader for an SDU. The MAC PDU may be transmitted with the first type of MAC subheader based on a size of each of the one or more MAC SDUs. The device may receive an allocation of resources for the MAC PDU, the allocation indicating the logical channel associated with the resources, wherein the one or more MAC SDUs for the MAC PDU are for the logical channel associated with a resource on which the MAC PDU is transmitted. FIGS. 12-15B illustrate example aspects of communication that the device may use in connection with transmitting the MAC PDU.

In some aspects, the device may transmit a scheduling request for a MAC SDU having a different size than a size threshold associated with the first type of MAC subheader. FIG. 12 illustrates an example of a UE outputting such a scheduling request.

In some aspects, the device may receive multiple grants for different transport block sizes (TBSs), the MAC PDU transmitted with the first type of subheader using one of the multiple grants having a TBS corresponding to a MAC SDU size in the MAC PDU. FIG. 13 illustrates example aspects of a UE obtaining multiple grants.

In some aspects, the device may receive a single grant associated with multiple configured TBSs, the MAC PDU transmitted with the first type of subheader using one of the multiple configured TBSs corresponding to the MAC SDU size in the MAC PDU. FIG. 15 illustrates example aspects of a UE obtaining a single grant.

In some aspects, the device may pad a PDU (e.g., an PDCP PDU or an RLC PDU) to meet the size threshold associated with the first type of MAC subheader. FIG. 17B illustrates example aspects of padding that a UE may employ.

In some aspects, a placement of the first type of the MAC subheader in the MAC PDU may be based on a rule. For example, the placement of the MAC subheader within the MAC PDU may indicate whether the MAC subheader is a first type (e.g., reduced) or a second type (non-reduced). FIG. 18A illustrates an example of MAC subheader placement within a PDU to indicate a type of the subheader.

In some aspects, the device may indicate the first type of the MAC subheader based on a resource in at least one of time or frequency in which the MAC PDU is transmitted. For example, the resource in which the MAC PDU is transmitted may indicate whether the MAC subheader is a first type (e.g., reduced) or a second type (non-reduced). FIG. 18B illustrates an example of MAC PDU transmitted in resources associated with a first type of the subheader.

In some aspects, the device may multiplex multiple MAC SDUs having the first type of MAC subheader in the MAC PDU. The device may multiplex certain MAC SDUs or MAC-CE in a MAC PDU having a type of MAC subheader. FIG. 18C illustrates an example of MAC SDUs multiplexed in a MAC PDU.

In some aspects, the transmission of the first type of MAC subheader may be based on a capability supported by a UE for at least one of a reduced MAC or a reduced PDCP. FIG. 19 illustrates an example of a UE indicating support for a UE capability to a network device. The capability may be for one of multiple types of reduced MACs, e.g., a separate capability. The capability may be for each of multiple types of reduced MACs, e.g., a common capability. The capability may be based on a transmission direction, the transmission direction being uplink, downlink, or sidelink.

In some aspects, the device may receive signaling enabling the first type of MAC subheader prior to transmission of the MAC PDU. FIG. 19 illustrates a UE receiving an indication enabling the first type of MAC subheader. In some aspects, the signaling may enable one of multiple types of reduced MACs, e.g., an individual or separate enablement. In some aspects, the signaling may enable each of multiple types of reduced MACs, e.g., common signaling. In some aspects, the signaling may enable the first type of the MAC subheader for a transmission direction, the transmission direction being uplink, downlink, or sidelink.

The device may receive an indication that the first type of MAC subheader is disabled and may transmit a second MAC PDU including the second type of MAC subheader in response to the indication. FIG. 19 illustrates an example of a UE transmitting a second type of MAC subheader in response to receiving an indication disabling the reduction.

Figure 21:
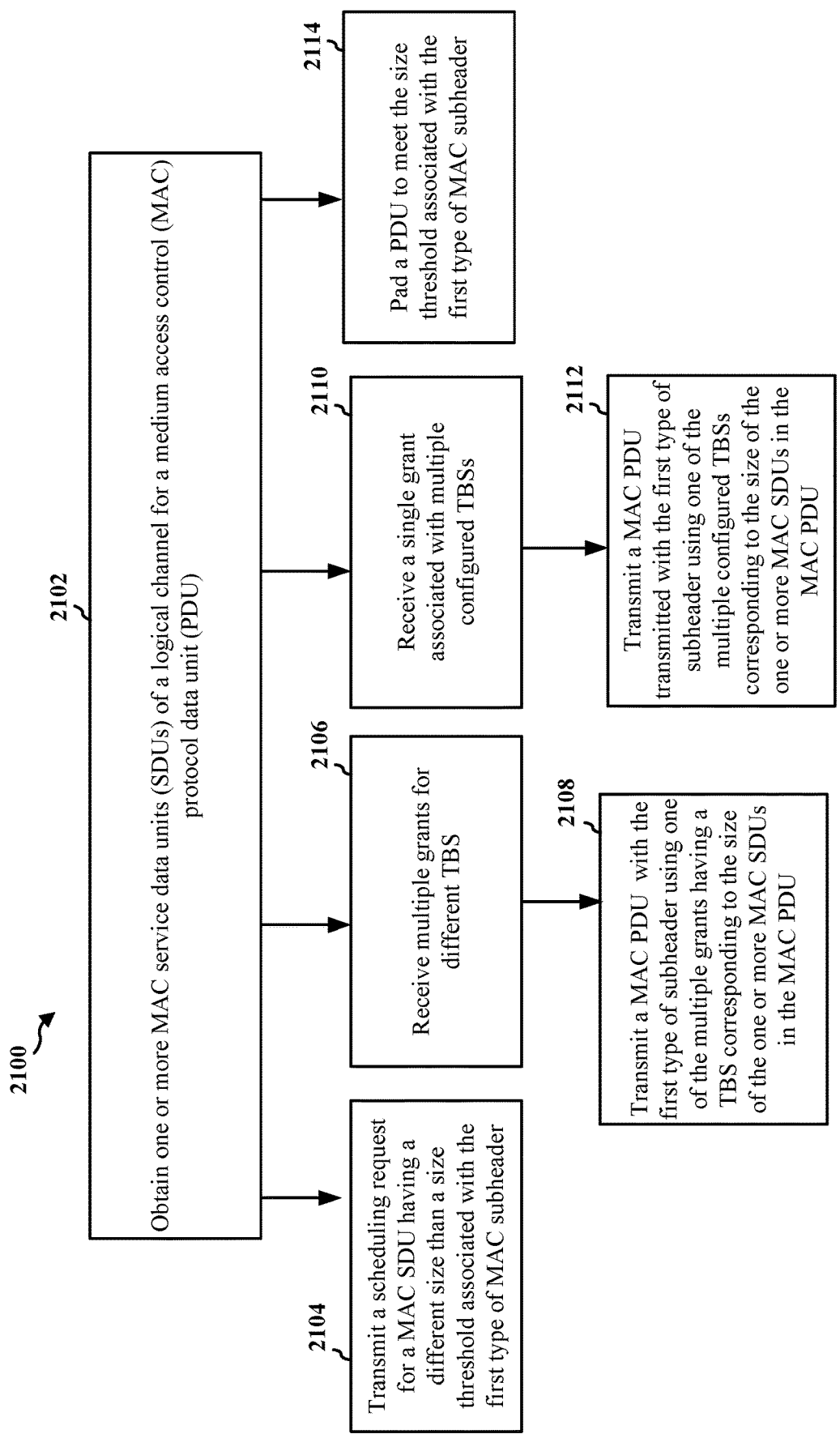
FIG. 21 is a flowchart of a method of wireless communication including overhead reduction as presented herein.

FIG. 21 is a flowchart 2100 of a method of wireless communication. In some aspects, the method may be performed by a UE (e.g., the UE 104, 350, 804, 904, 1104, 1204, 1304, 1504, 1902; the apparatus 2204). The method may enable a reduction of overhead by providing for a reduced MAC subheader.

At 2102, the device obtains, e.g. receives, one or more MAC SDUs of a logical channel for a MAC PDU. The obtaining or reception may be performed, e.g., by the protocol reduction component 198 described in connection with FIG. 1, FIG. 3, or FIG. 22. Example aspects of having SDUs for transmission are described in connection with FIGS. 12-15B, as well as FIGS. 9B and 11B.

In response to a first size of at least one of the MAC SDUs being different than a second size associated with a type of MAC subheader, the device may perform one or more of the aspects described in connection with 2104-2114. The action may be performed, e.g., by the protocol reduction component 198 described in connection with FIG. 1, FIG. 3, or FIG. 22.

For example, as illustrated at 2104, the device may transmit a scheduling request for a MAC SDU having a different size than a size threshold. FIG. 12 illustrate an example of a UE transmitting such a scheduling request.

As illustrated at 2106, the device may receive multiple grants for different TBS and may transmit, as illustrated at 2108, the MAC PDU with the type of subheader using one of the multiple grants having a TBS corresponding to the size of the one or more MAC SDUs in the MAC PDU. FIG. 13 illustrates example aspects of a UE receiving multiple grants.

As illustrated at 2110, the device may receive a single grant associated with multiple configured TBSs, and at 2112, may transmit the MAC PDU with the type of subheader using one of the multiple configured TBSs corresponding to the size of the one or more MAC SDUs in the MAC PDU. FIG. 15 illustrates example aspects of a UE receiving a single grant.

As illustrated at 2114, the device may pad a PDU (e.g., an PDCP PDU or an RLC PDU) to meet the size threshold. FIG. 17B illustrates example aspects of padding that a UE may employ.

Figure 22:
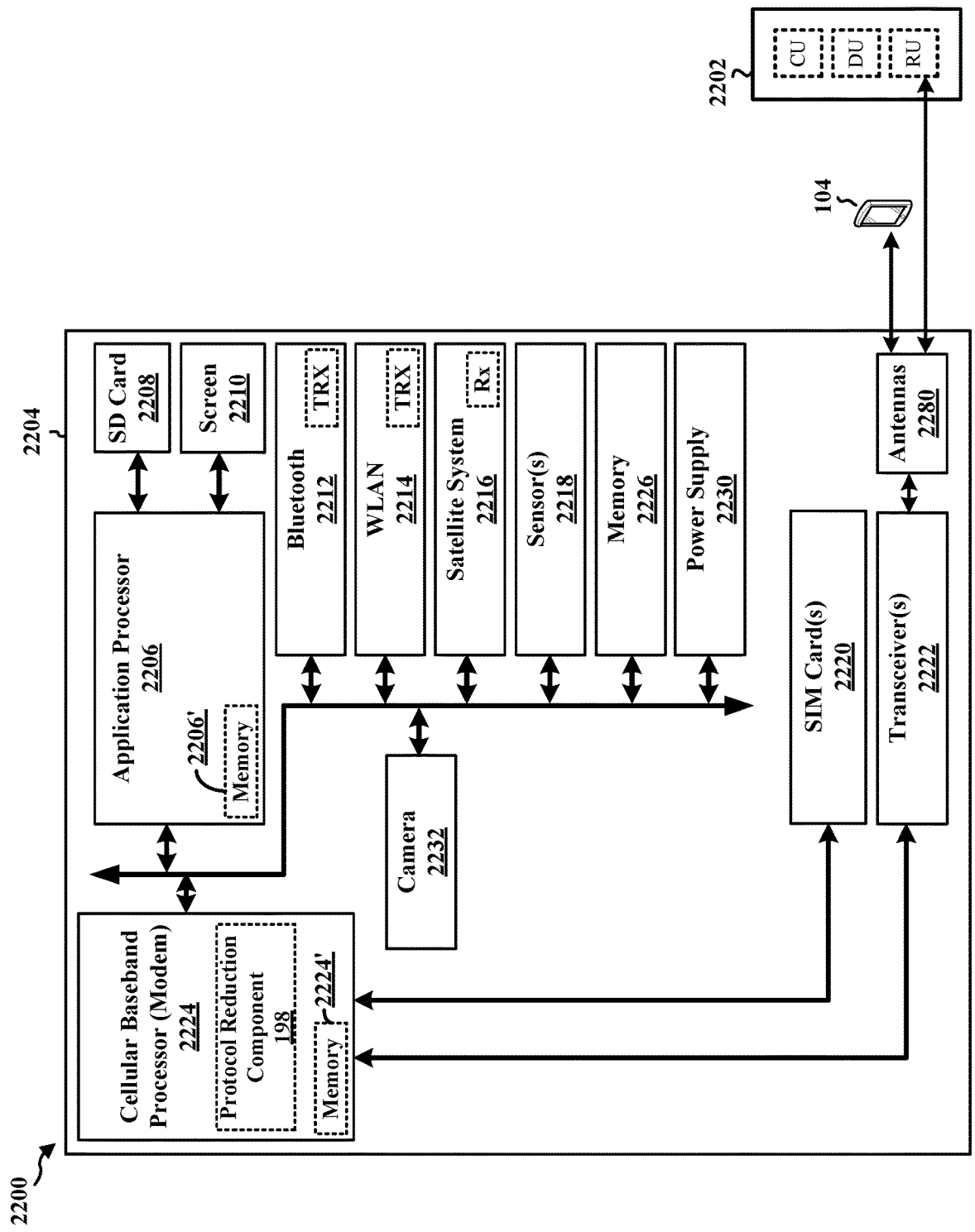
FIG. 22 is a diagram illustrating an example of a hardware implementation for an example apparatus configured to perform overhead reduction as presented herein.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include a cellular baseband processor 2224 (also referred to as a modem) coupled to one or more transceivers 2222 (e.g., cellular RF transceiver). The cellular baseband processor 2224 may include on-chip memory 2224'. In some aspects, the apparatus 2204 may further include one or more subscriber identity modules (SIM) cards 2220 and an application processor 2206 coupled to a secure digital (SD) card 2208 and a screen 2210. The application processor 2206 may include on-chip memory 2206'. In some aspects, the apparatus 2204 may further include a Bluetooth module 2212, a WLAN module 2214, a satellite system module 2216 (e.g., GNSS module), one or more sensor modules 2218 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the satellite system module 2216 may include an on-chip transceiver (TRX)/receiver (RX). The cellular baseband processor 2224 communicates through the transceiver(s) 2222 via one or more antennas 2280 with the UE 104 and/or with an RU associated with a network entity 2202. The cellular baseband processor 2224 and the application processor 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor 2224 and the application processor 2206 are each responsible for general processing, including the execution of software stored on the computer-readable medium/memory. The software, when executed by the cellular baseband processor 2224/application processor 2206, causes the cellular baseband processor 2224/application processor 2206 to perform the various functions described supra. The computer-readable medium/memory may also be used for storing data that is manipulated by the cellular baseband processor 2224/application processor 2206 when executing software. The cellular baseband processor 2224/application processor 2206 may be a component of the UE 350 and may include the memory 360 and/or at least one of the TX processor 368, the RX processor 356, and the controller/processor 359. In one configuration, the apparatus 2204 may be a processor chip (modem and/or application) and include just the cellular baseband processor 2224 and/or the application processor 2206, and in another configuration, the apparatus 2204 may be the entire UE (e.g., see UE 350 of FIG. 3) and include the additional modules of the apparatus 2204.

As discussed supra, the component 198 is configured to transmit a MAC PDU including one or more MAC SDUs of a logical channel and transmit a first type of MAC subheader including or excluding first LCID information and including or excluding first length information or a second type of MAC subheader including second LCID information and second length information, where a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader. In some aspects, the component 198 may be configured to obtain one or more MAC SDUs of a logical channel for a MAC PDU and, in response to a first size of at least one of the MAC SDUs being different than a second size associated with a type of MAC subheader, perform at least one of: transmitting a scheduling request for a MAC SDU having a different size than a size threshold; receive multiple grants for different transport block size (TBS) and transmitting the MAC PDU with the first type of subheader using one of the multiple grants having a TBS corresponding to the size of the one or more MAC SDUs in the MAC PDU; receive a single grant associated with multiple configured TBSs, and transmitting the MAC PDU with the first type of subheader using one of the multiple configured TBSs corresponding to the size of the one or more MAC SDUs in the MAC PDU; or pad a PDU to meet the size threshold. The component 198 may be configured to perform any of the aspects described in connection with FIG. 20, 21, or performed by the UE in FIG. 19. The component 198 may be within the cellular baseband processor 2224, the application processor 2206, or both the cellular baseband processor 2224 and the application processor 2206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2204 may include a variety of components configured for various functions. In one configuration, the apparatus 2204, and in particular the cellular baseband processor 2224 and/or the application processor 2206, includes means for transmitting a MAC PDU including one or more MAC SDUs of a logical channel and means for transmitting a first type of MAC subheader including or excluding first LCID information and including or excluding first length information or a second type of MAC subheader including second LCID information and second length information, where a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader, means for obtaining one or more MAC SDUs of a logical channel for a MAC PDU and means for performing, in response to a first size of at least one of the MAC SDUs being different than a second size associated with a type of MAC subheader, at least one of: transmitting a scheduling request for a MAC SDU having a different size than a size threshold; receive multiple grants for different TBS and transmitting the MAC PDU with the first type of subheader using one of the multiple grants having a TBS corresponding to the size of the one or more MAC SDUs in the MAC PDU; receive a single grant associated with multiple configured TBSs, and transmitting the MAC PDU with the first type of subheader using one of the multiple configured TBSs corresponding to the size of the one or more MAC SDUs in the MAC PDU; or pad a PDU to meet the size threshold. The means may be the component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 23:
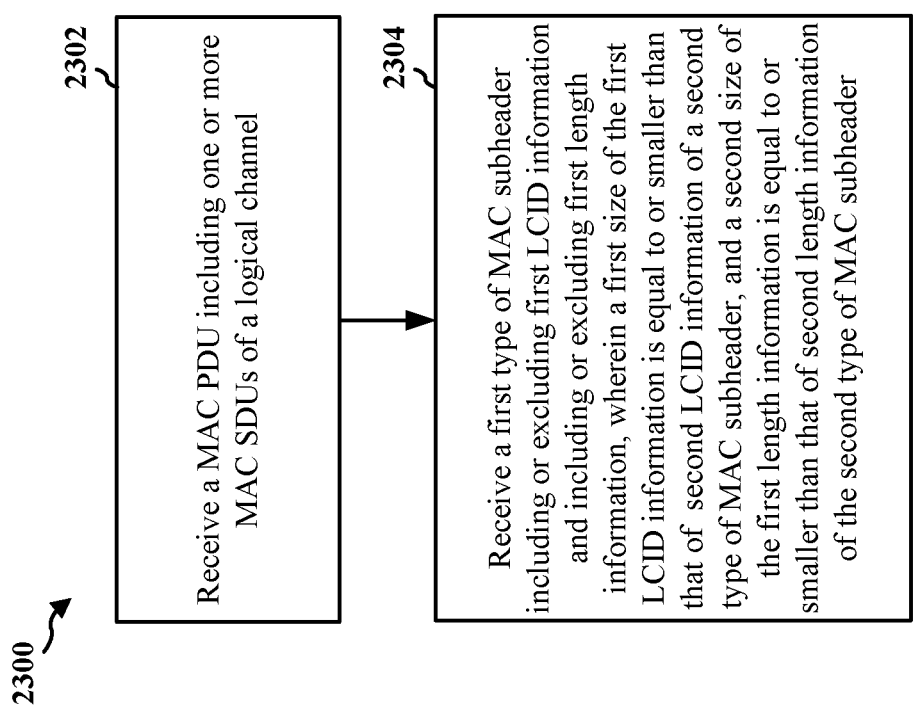
FIG. 23 is a flowchart of a method of wireless communication including overhead reduction as presented herein.

FIG. 23 is a flowchart 2300 of a method of wireless communication. The method may be performed by a base station, a component of a base station, or a device implementing base station functionality (e.g., the base station 102, 310; the network entity 802, 902, 1102, 1202, 1302, 1502, 1904, 2202). The method may enable a reduction of overhead by providing for a reduced MAC subheader.

At 2302, the device receives a MAC PDU including one or more MAC SDUs of a logical channel. The reception may be performed by the protocol reduction component 199 described in connection with FIG. 1, FIG. 3, or FIG. 24. Example aspects of MAC PDU reception are described in connection with FIGS. 4-19.

At 2304, the device receives a first type of MAC subheader including or excluding first logical channel identifier information and including or excluding first length information, where a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader. The reception may be performed by the protocol reduction component 199 described in connection with FIG. 1, FIG. 3, or FIG. 24. The first type of MAC subheader may include a field that indicates a format for the first type of MAC subheader. For example, the F1 field, or another field may indicate the type of subheader, e.g., a reduced size subheader.

In some aspects, the first type of MAC subheader includes the first LCID information that is smaller than the second LCID information of the second type of MAC subheader, and the first type of MAC subheader includes the first length information that is smaller than the second length information of the second type of MAC subheader. As an example, FIGS. 6A-6C illustrate example aspects of the first type of MAC subheader. The size of the first LCID information and the first length information may be based on a rule, e.g., a defined length or other explicit length, or may be based on content of the MAC PDU, e.g., an implicit length. A configuration for the logical channel may allow the use of the first type of MAC subheader and may configure the logical channel with an identify used as the first LCID information in the first type of MAC subheader. The MAC PDU may include at least one of: multiple SDUs for different logical channels, a MAC-CE, or padding. In some aspects, the device may transmit the second type of MAC subheader in response to a request to transmit LCID information that is larger than an LCID field size for the first type of MAC subheader or length information.

In some aspects, the first type of MAC subheader does not include the first LCID information, and includes the first length information. For example, FIG. 7 illustrates an example of a MAC subheader without an LCID. The MAC PDU may include at least one of: multiple SDUs for a same logical channel, a MAC-CE, or padding. In some aspects, the device may receive the second type of MAC subheader in response to a request for a MAC PDU including multiple SDUs for different logical channels. FIG. 9B illustrates aspects of communication that the device may use for receiving the MAC PDU. In some aspects, the device may transmit an allocation of resources for the MAC PDU, the allocation indicating the logical channel associated with the resources, wherein the one or more SDUs for the MAC PDU are for the logical channel associated with a resource on which the MAC PDU is received. The allocation of the resources may be indicated in at least one of RRC signaling, or control information in a PDCCH, such as DCI. In some aspects, the device may receive a MAC-CE requesting a second allocation of resources indicating a second logical channel associated with the second allocation of resources. In response, the device may transmit the second allocation of resources and receive the second type of MAC subheader using the second allocation of resources in response to receiving the second allocation of resources.

In some aspects, the first type of MAC subheader may include the first LCID information and not include the first length information. FIGS. 10A and 10B illustrate aspects of first type of MAC subheader that does not include length information. In some aspects, the device may transmit a configuration of a first L of the one or more MAC SDUs. The device may receive the second type of MAC subheader in response to a request for a MAC SDU having a second L different from the first L. FIG. 11B illustrates example aspects that the network may use in connection with receiving the MAC PDU. The first type of MAC subheader may be associated with a MAC SDU size. For example, in FIG. 11B, the UL grant is for SDUs of 100 bytes. In some aspects, the MAC PDU may include multiple SDUs for different logical channels.

In some aspects, the first type of MAC subheader does not include the first LCID information and does not include the second length information or has zero size. For example, the device may not receive any information in a MAC subheader for an SDU. The MAC PDU may be received with the first type of MAC subheader based on a size of each of the one or more MAC SDUs. The device may transmit an allocation of resources for the MAC PDU, the allocation indicating the logical channel associated with the resources, wherein the one or more MAC SDUs for the MAC PDU are for the logical channel associated with a resource on which the MAC PDU is received. FIGS. 12-15B illustrate example aspects of communication that the device may use in connection with receiving the MAC PDU.

In some aspects, the device may receive a scheduling request for a MAC SDU having a different size than a size threshold associated with the first type of MAC subheader. FIG. 12 illustrate an example of a base station receiving such a scheduling request.

In some aspects, the device may transmit multiple grants for different transport block sizes (TBSs), the MAC PDU received with the first type of subheader using one of the multiple grants having a TBS corresponding to a MAC SDU size in the MAC PDU. FIG. 13 illustrates example aspects of a base station transmitting multiple grants.

In some aspects, the device may transmit a single grant associated with multiple configured TBSs, the MAC PDU received with the first type of subheader using one of the multiple configured TBSs corresponding to the MAC SDU size in the MAC PDU. FIG. 15 illustrates example aspects of a base station transmitting a single grant.

In some aspects, the device may receive a padded PDU (e.g., an PDCP PDU or an RLC PDU) that is padded to meet the size threshold associated with the first type of MAC subheader. FIG. 17B illustrates example aspects of padding that may be received in the PDU.

In some aspects, a placement of the first type of the MAC subheader in the MAC PDU may be based on a rule. For example, the placement of the MAC subheader within the MAC PDU may indicate whether the MAC subheader is a first type (e.g., reduced) or a second type (non-reduced). FIG. 18A illustrates an example of MAC subheader placement within a PDU to indicate a type of the subheader.

In some aspects, the device may indicate the first type of the MAC subheader based on a resource in at least one of time or frequency in which the MAC PDU is transmitted. For example, the resource in which the MAC PDU is received may indicate whether the MAC subheader is a first type (e.g., reduced) or a second type (non-reduced). FIG. 18B illustrates an example of MAC PDU received in resources associated with a first type of the subheader.

In some aspects, multiple MAC SDUs having the first type of MAC subheader may be multiplexed in the MAC PDU. FIG. 18C illustrates an example of MAC SDUs multiplexed in a MAC PDU.

In some aspects, the reception of the first type of MAC subheader may be based on a capability supported by a UE for at least one of a reduced MAC or a reduced PDCP. FIG. 19 illustrates an example of a network entity receiving an indication of UE support for a UE capability. The capability may be for one of multiple types of reduced MACs, e.g., a separate capability. The capability may be for each of multiple types of reduced MACs, e.g., a common capability. The capability may be based on a transmission direction, the transmission direction being uplink, downlink, or sidelink.

In some aspects, the device may transmit signaling enabling the first type of MAC subheader prior to transmission of the MAC PDU. FIG. 19 illustrates a network entity transmitting an indication enabling the first type of MAC subheader. In some aspects, the signaling may enable one of multiple types of reduced MACs, e.g., an individual or separate enablement. In some aspects, the signaling may enable each of multiple types of reduced MACs, e.g., common signaling. In some aspects, the signaling may enable the first type of the MAC subheader for a transmission direction, the transmission direction being uplink, downlink, or sidelink.

The device may transmit an indication that the first type of MAC subheader is disabled and may receive a second MAC PDU including the second type of MAC subheader in response to the indication. FIG. 19 illustrates an example of a network entity receiving a second type of MAC subheader in response to transmitting an indication disabling the reduction.

Figure 24:
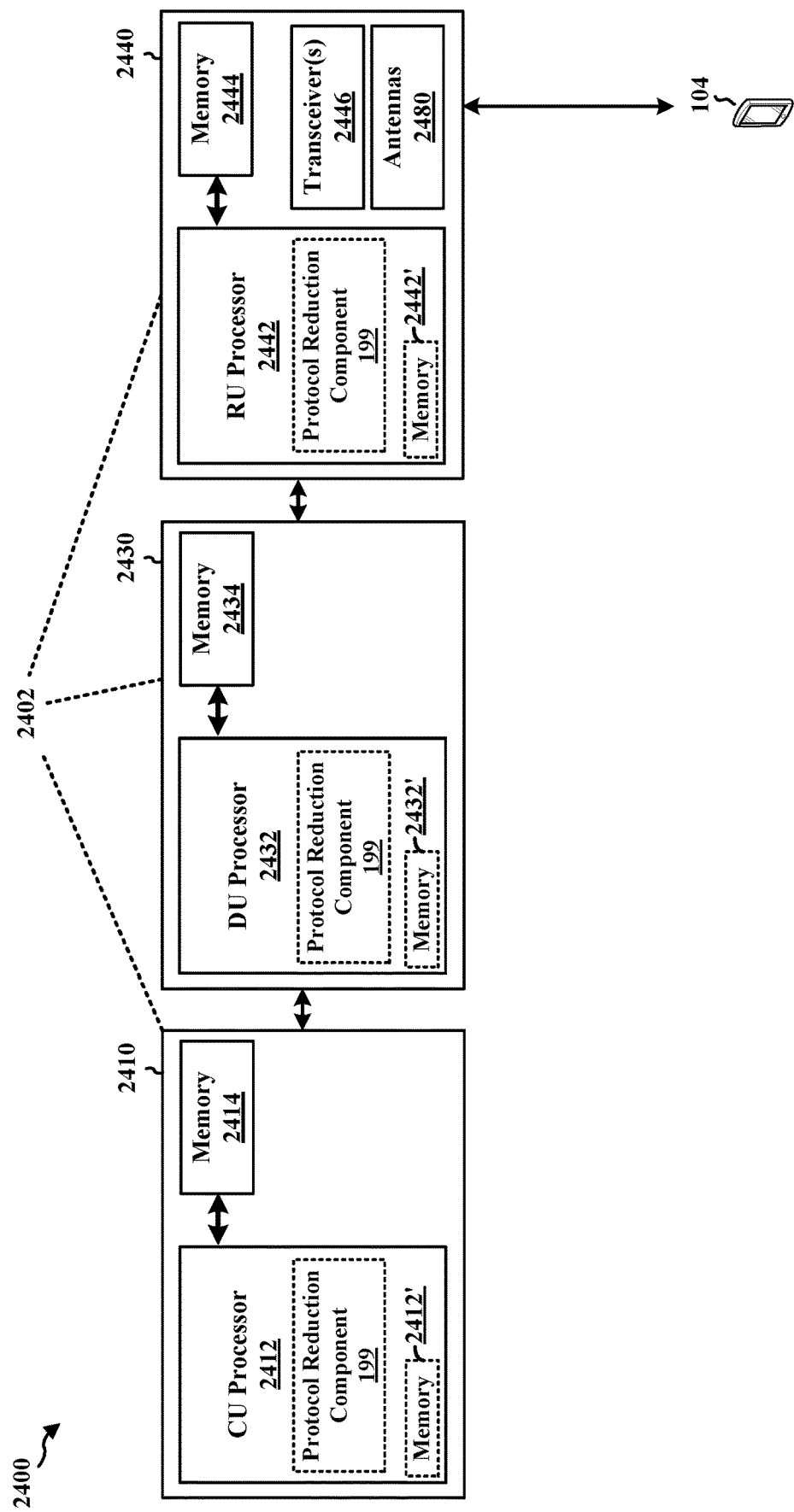
FIG. 24 is a diagram illustrating an example of a hardware implementation for an example network entity in accordance with various aspects presented herein.

FIG. 24 is a diagram 2400 illustrating an example of a hardware implementation for a network entity 2402. The network entity 2402 may be a BS, a component of a BS, or may implement BS functionality. The network entity 2402 may include at least one of a CU 2410, a DU 2430, or an RU 2440. For example, depending on the layer functionality handled by the component 199, the network entity 2402 may include the CU 2410; both the CU 2410 and the DU 2430; each of the CU 2410, the DU 2430, and the RU 2440; the DU 2430; both the DU 2430 and the RU 2440; or the RU 2440. The CU 2410 may include a CU processor 2412. The CU processor 2412 may include on-chip memory 2412'. In some aspects, the CU 2410 may further include additional memory modules 2414. The CU 2410 communicates with the DU 2430. The DU 2430 may include a DU processor 2432. The DU processor 2432 may include on-chip memory 2432'. In some aspects, the DU 2430 may further include additional memory modules 2434. The DU 2430 communicates with the RU 2440. The RU 2440 may include an RU processor 2442. The RU processor 2442 may include on-chip memory 2442'. In some aspects, the RU 2440 may further include additional memory modules 2444, one or more transceivers 2446, and antennas 2480. The RU 2440 communicates with the UE 104. The on-chip memory 2412', 2432', 2442' and the additional memory modules 2414, 2434, 2444 may each be considered a computer-readable medium/memory. Each computer-readable medium/memory may be non-transitory. Each of the processors 2412, 2432, 2442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive a MAC PDU including one or more MAC SDUs of a logical channel and receive a first type of MAC subheader including or excluding first logical channel identifier information and including or excluding first length information or a second type of MAC subheader including second LCID information and second length information, where a size of the first LCID information is equal to or smaller than the second LCID information, and a size of the first length information is equal to or smaller than the second length information. The component 199 may be configured to perform any of the aspects described in connection with FIG. 23 and/or the aspects performed by the network entity in FIG. 19. The component 199 may be within one or more processors of one or more of the CU 2410, DU 2430, and the RU 2440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 2402 may include a variety of components configured for various functions. In one configuration, the network entity 2402 includes means for receiving a MAC PDU including one or more MAC SDUs of a logical channel and means for receiving a first type of MAC subheader including or excluding first logical channel identifier information and including or excluding first length information or a second type of MAC subheader including second LCID information and second length information, where a size of the first LCID information is equal to or smaller than the second LCID information, and a size of the first length information is equal to or smaller than the second length information. The means may be the component 199 of the network entity 2402 configured to perform the functions recited by the means. As described supra, the network entity 2402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, including transmitting a MAC PDU including one or more MAC SDUs of a logical channel. The method may also include transmitting a first type of MAC subheader including or excluding first LCID information and including or excluding first length information. A first size of the first LCID information may be equal to or smaller than a second size of second LCID information of a second type of MAC subheader that is different than the first type of MAC subheader, and a third size of the first length information is equal to or smaller than a fourth size of second length information of the second type of MAC subheader.

Aspect 2 is the method of aspect 1, the first type of MAC subheader includes the first LCID information that has a first size that is smaller than the second size of the second LCID information of the second type of MAC subheader, and the first type of MAC subheader includes the first length information that has the third size that is smaller than the fourth size of the second length information of the second type of MAC subheader.

Aspect 3 is the method of aspect 2, where a size of the first LCID information and the first length information may be based on a rule or content of the MAC PDU.

Aspect 4 is the method of any of aspects 2 to 3, where a configuration for the logical channel may enable use of the first type of MAC subheader and may configure the logical channel with an identifier used as the first LCID information in the first type of MAC subheader.

Aspect 5 is the method of any of aspects 2 to 4, where the MAC PDU includes at least one of (a) multiple SDUs for different logical channels, (b) a MAC-CE, or (c) padding.

Aspect 6 is the method of any of aspects 1 to 5, where the first type of MAC subheader includes a field that indicates a format for the first type of MAC subheader.

Aspect 7 is the method of aspect 6, further including transmitting the second type of MAC subheader in response to a request to perform at least one of (a) transmitting a MAC SDU of the logical channel without use of the first type of MAC subheader, (b) transmitting the MAC SDU of the logical channel of which a fifth size of third LCID information is larger than the first size of the first LCID information, (c) transmitting the MAC SDU having an SDU size larger than a maximum size supported by the first length information, or (d) transmitting the MAC PDU including multiple SDUs of different logical channels.

Aspect 8 is the method of any of aspects 1 to 7, where the first type of MAC subheader does not include the first LCID information and includes the first length information.

Aspect 9 is the method of aspect 8, where the MAC PDU includes at least one of (a) multiple SDUs for a same logical channel, (b) a MAC-CE, or (c) padding.

Aspect 10 is the method of any of aspects 8 to 9, further including receiving an allocation of resources for the MAC PDU. The allocation may indicate the logical channel associated with the resources. The one or more SDUs for the MAC PDU may be for the logical channel associated with a resource on which the MAC PDU is transmitted.

Aspect 11 is the method of aspect 10, where the allocation of the resources is indicated in at least one of (a) RRC signaling or (b) control information in a PDCCH.

Aspect 12 is the method of any of aspects 1 to 11, where the first type of MAC subheader includes the first LCID information and does not include the first length information.

Aspect 13 is the method of aspect 12, where the first type of MAC subheader is associated with a MAC SDU size.

Aspect 14 is the method of any of aspects 12 to 13, where the MAC PDU includes multiple SDUs for different logical channels.

Aspect 15 is the method of any of aspects 1 to 14, where the first type of MAC subheader does not include the first LCID information and does not include the second length information or the first type of MAC subheader has zero size.

Aspect 16 is the method of aspect 15, where the MAC PDU is transmitted with the first type of MAC subheader based on a size of each of the one or more MAC SDUs. The method may further include receiving an allocation of resources for the MAC PDU. The allocation may indicate the logical channel associated with the resources. The one or more MAC SDUs for the MAC PDU may be for the logical channel associated with a resource on which the MAC PDU is transmitted.

Aspect 17 is the method of any of aspects 1 to 16, further including performing one or more of (a) transmitting a scheduling request for a MAC SDU having a different size than a size threshold associated with the first type of MAC subheader, (b) receiving multiple grants for different TBS and transmitting the MAC PDU with the first type of subheader using one of the multiple grants having a TBS corresponding to a MAC SDU size in the MAC PDU, (c) receiving a single grant associated with multiple configured TBSs and transmitting the MAC PDU transmit with the first type of subheader using one of the multiple configured TBSs corresponding to the MAC SDU size in the MAC PDU, or (d) pad a PDU to meet the size threshold associated with the first type of MAC subheader.

Aspect 18 is the method of any of aspects 1 to 17, where a placement of the first type of the MAC subheader in the MAC PDU is based on a rule.

Aspect 19 is the method of any of aspects 1 to 18, further including indicating the first type of the MAC subheader based on a resource in at least one of time or frequency in which the MAC PDU is transmitted.

Aspect 20 is the method of any of aspects 1 to 19, further including multiplexing multiple MAC SDUs having the first type of MAC subheader in the MAC PDU.

Aspect 21 is the method of any of aspects 1 to 20, where transmission of the first type of MAC subheader is based on a capability supported by a UE for at least one of a reduced MAC or a reduced PDCP.

Aspect 22 is the method of any of aspects 1 to 21, further including receiving signaling enabling the first type of MAC subheader prior to transmission of the MAC PDU.

Aspect 23 is the method of any of aspects 1 to 22, further including receiving an indication that the first type of MAC subheader is disabled, and transmitting a second MAC PDU including the second type of MAC subheader in response to the indication.

Aspect 24 is a method of wireless communication, including obtaining one or more MAC SDUs of a logical channel for a MAC PDU. The method may further include, in response to a first size of at least one of the MAC SDUs being different than a second size associated with a MAC subheader, perform at least one of (a) transmitting a scheduling request for a MAC SDU having a different size than a size threshold, (b) transmit the MAC PDU using a grant from multiple grants for different transport block size (TBS), the grant having a TBS corresponding to the size of the one or more MAC SDUs in the MAC PDU; (c) transmit the MAC PDU using a configured TBS from multiple configured TBSs associated with a single grant, the configured TBS corresponding to the size of the one or more MAC SDUs in the MAC PDU, and (d) padding a PDU to meet the size threshold.

Aspect 25 is a method of wireless communication, further including receiving a MAC PDU including one or more MAC SDUs of a logical channel. The method may further include receiving a first type of MAC subheader including or excluding first LCID information and including or excluding first length information. A first size of the first LCID information may be equal to or smaller than a second size of second LCID information of a second type of MAC subheader that is different than the first type of MAC subheader, and a third size of the first length information is equal to or smaller than a fourth size of second length information of the second type of MAC subheader.

Aspect 26 is the method of aspect 25, where the first type of MAC subheader may include the first LCID information that is smaller than the second LCID information of the second type of MAC subheader. The first type of MAC subheader may also include the first length information that is smaller than the second length information of the second type of MAC subheader.

Aspect 27 is the method of any of aspects 25 to 26, where the first type of MAC subheader does not include the first LCID information, and includes the first length information.

Aspect 28 is the method of any of aspects 25 to 27, where the first type of MAC subheader includes the first LCID information, and does not include the first length information.

Aspect 29 is the method of any of aspects 25 to 28, where the first type of MAC subheader does not include the first LCID information and the first length information or has zero size.

What is claimed is:

1. An apparatus for wireless communication, comprising:
    memory; and
    at least one processor coupled to the memory and configured to:
        transmit a medium access control (MAC) protocol data unit (PDU) including one or more MAC service data units (SDUs) of a logical channel; and
        transmit a first type of MAC subheader including or excluding first logical channel identifier (LCID) information and including or excluding first length information, wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

2. The apparatus of claim 1, wherein the first type of MAC subheader includes the first LCID information that has the first size that is smaller than the second size of the second LCID information of the second type of MAC subheader, and the first type of MAC subheader includes the first length information that has the third size that is smaller than the fourth size of the second length information of the second type of MAC subheader.

3. The apparatus of claim 2, wherein a size of the first LCID information and the first length information are based on a rule or content of the MAC PDU.

4. The apparatus of claim 2, wherein a configuration for the logical channel enables use of the first type of MAC subheader and configures the logical channel with an identifier used as the first LCID information in the first type of MAC subheader.

5. The apparatus of claim 2, wherein the MAC PDU includes at least one of:
    multiple SDUs for different logical channels,
    a medium access control-control element (MAC-CE), or
    padding.

6. The apparatus of claim 1, further comprising at least one transceiver coupled to the at least one processor, wherein the at least one processor is configured to transmit the first type of MAC subheader using the at least one transceiver, and wherein the first type of MAC subheader includes a field that indicates a format for the first type of MAC subheader.

7. The apparatus of claim 6, wherein the at least one processor is configured to:
    transmit the second type of MAC subheader in response to a request from a receiver to perform at least one of:
        transmitting a MAC SDU of the logical channel without use of the first type of MAC subheader,
        transmitting the MAC SDU of the logical channel of which a fifth size of third LCID information is larger than the first size of the first LCID information,
        transmitting the MAC SDU having an SDU size larger than a maximum size supported by the first length information, or
        transmitting the MAC PDU including multiple SDUs of different logical channels.

8. The apparatus of claim 1, wherein the first type of MAC subheader does not include the first LCID information, and includes the first length information.

9. The apparatus of claim 8, wherein the MAC PDU includes at least one of:
    multiple SDUs for a same logical channel,
    a medium access control-control element (MAC-CE), or
    padding.

10. The apparatus of claim 8, wherein the at least one processor is configured to:
    receive an allocation of resources for the MAC PDU, the allocation indicating the logical channel associated with the resources, wherein the one or more SDUs for the MAC PDU are for the logical channel associated with a resource on which the MAC PDU is transmitted.

11. The apparatus of claim 10, wherein the allocation of the resources is indicated in at least one of:
    radio resource control (RRC) signaling, or
    control information in a physical downlink control channel (PDCCH).

12. The apparatus of claim 1, wherein the first type of MAC subheader includes the first LCID information and does not include the first length information.

13. The apparatus of claim 12, wherein the first type of MAC subheader is associated with a MAC SDU size.

14. The apparatus of claim 12, wherein the MAC PDU includes multiple SDUs for different logical channels.

15. The apparatus of claim 1, wherein the first type of MAC subheader does not include the first LCID information and does not include the second length information or the first type of MAC subheader has zero size.

16. The apparatus of claim 15, wherein the MAC PDU is transmitted with the first type of MAC subheader based on a size of each of the one or more MAC SDUs, wherein the at least one processor is further configured to:
    receive an allocation of resources for the MAC PDU, the allocation indicating the logical channel associated with the resources, wherein the one or more MAC SDUs for the MAC PDU are for the logical channel associated with a resource on which the MAC PDU is transmitted.

17. The apparatus of claim 1, wherein the at least one processor is further configured to perform one or more of:

transmit a scheduling request for a MAC SDU having a different size than a size threshold associated with the first type of MAC subheader;

receive multiple grants for different transport block size (TBS) and transmit the MAC PDU with the first type of subheader using one of the multiple grants having a TBS corresponding to a MAC SDU size in the MAC PDU;

receive a single grant associated with multiple configured TBSs and transmit the MAC PDU with the first type of subheader using one of the multiple configured TBSs corresponding to the MAC SDU size in the MAC PDU; or pad a protocol data unit (PDU) to meet the size threshold associated with the first type of MAC subheader.

18. The apparatus of claim 1, wherein a placement of the first type of the MAC subheader in the MAC PDU is based on a rule.

19. The apparatus of claim 1, wherein the at least one processor is further configured to:
indicate the first type of the MAC subheader based on a resource in at least one of time or frequency in which the MAC PDU is transmitted.

20. The apparatus of claim 1, wherein the at least one processor is further configured to:
multiplex multiple MAC SDUs having the first type of MAC subheader in the MAC PDU.

21. The apparatus of claim 1, wherein transmission of the first type of MAC subheader is based on a capability supported by a user equipment (UE) for at least one of a reduced MAC or a reduced packet data convergence protocol (PDCP).

22. The apparatus of claim 1, wherein the at least one processor is further configured to:
receive signaling enabling the first type of MAC subheader prior to transmission of the MAC PDU.

23. The apparatus of claim 22, wherein the at least one processor is further configured to:
receive an indication that the first type of MAC subheader is disabled; and
transmit a second MAC PDU including the second type of MAC subheader in response to the indication.

24. An apparatus for wireless communication, comprising:
memory; and
at least one processor coupled to the memory and configured to:
receive a medium access control (MAC) protocol data unit (PDU) including one or more MAC service data units (SDUs) of a logical channel; and
receive a first type of MAC subheader including or excluding first logical channel identifier (LCID) information and including or excluding first length information,
wherein a first size of the first LCID information is equal to or smaller than second LCID information of a second type of MAC subheader that is different than the first type of MAC subheader, and a second size of the first length information is equal to or smaller than second length information of the second type of MAC subheader.

25. The apparatus of claim 24, wherein the first type of MAC subheader includes the first LCID information that is smaller than the second LCID information of the second type of MAC subheader, and the first type of MAC subheader includes the first length information that is smaller than the second length information of the second type of MAC subheader.

26. The apparatus of claim 24, wherein the first type of MAC subheader does not include the first LCID information, and includes the first length information.

27. The apparatus of claim 24, wherein the first type of MAC subheader includes the first LCID information, and does not include the first length information.

28. The apparatus of claim 24, wherein the first type of MAC subheader does not include the first LCID information and the first length information or has zero size.

29. A method of wireless communication, comprising:
transmitting a medium access control (MAC) protocol data unit (PDU) including one or more MAC service data units (SDUs) of a logical channel; and
transmitting a first type of MAC subheader including or excluding first logical channel identifier (LCID) information and including or excluding first length information or a second type of MAC subheader including second LCID information and second length information,
wherein a first size of the first LCID information is equal to or smaller than a second size of second LCID information of a second type of MAC subheader that is different than the first type of MAC subheader, and a third size of the first length information is equal to or smaller than a fourth size of second length information of the second type of MAC subheader.

* * * * *